(12) United States Patent
Svensson et al.

(10) Patent No.: US 10,446,060 B2
(45) Date of Patent: Oct. 15, 2019

(54) METHODS, SYSTEMS AND KIT FOR DEMONSTRATING MEDICAL PROCEDURE

(71) Applicant: Abbott Cardiovascular Systems, Inc., Santa Clara, CA (US)

(72) Inventors: Bjorn G. Svensson, Gilroy, CA (US); Michael L. Green, Pleasanton, CA (US); Caroline A. Colao, Sunnyvale, CA (US); Thomas G. Hales, Piedmont, CA (US); Michael J. Saso, San Jose, CA (US)

(73) Assignee: Abbott Cardiovascular Systems, Inc., Santa Clara, CA (US)

(*) Notice: Subject to any disclaimer, the term of this patent is extended or adjusted under 35 U.S.C. 154(b) by 835 days.

(21) Appl. No.: 13/840,406

(22) Filed: Mar. 15, 2013

(65) Prior Publication Data

US 2014/0272873 A1 Sep. 18, 2014

(51) Int. Cl.
G09B 23/24 (2006.01)
G09B 23/34 (2006.01)

(52) U.S. Cl.
CPC .................. G09B 23/34 (2013.01)

(58) Field of Classification Search
CPC .................. G09B 23/28; G09B 23/30
See application file for complete search history.

(56) References Cited

U.S. PATENT DOCUMENTS

| | | | | |
|---|---|---|---|---|
| 3,209,469 A * | 10/1965 | James | ............................ | 434/265 |
| 3,704,528 A * | 12/1972 | Lewis | ............................ | 434/268 |
| 4,988,106 A * | 1/1991 | Coonrod | ............ | A63B 69/3661 473/160 |
| 5,215,469 A * | 6/1993 | Kohnke | ............... | G09B 23/285 434/268 |
| 5,310,348 A * | 5/1994 | Miller | .......................... | 434/262 |
| 5,403,191 A * | 4/1995 | Tuason | ............... | G09B 23/285 434/262 |
| 5,868,429 A * | 2/1999 | Raymond et al. | .............. | 283/34 |
| 6,063,227 A | 5/2000 | Raymond et al. | | |
| 6,907,629 B2 * | 6/2005 | Longton et al. | .................. | 5/601 |
| D571,659 S * | 6/2008 | Rozanski | ........................ | D9/457 |
| 2004/0126746 A1* | 7/2004 | Toly | ........................ | G09B 23/28 434/262 |
| 2005/0214725 A1* | 9/2005 | Feygin | ................. | G09B 23/285 434/262 |
| 2008/0076101 A1* | 3/2008 | Hyde | ..................... | G09B 23/30 434/272 |
| 2008/0293029 A1* | 11/2008 | Wilkins | ............... | G09B 23/286 434/272 |
| 2009/0226867 A1* | 9/2009 | Kalafut | .................. | G09B 23/32 434/268 |

FOREIGN PATENT DOCUMENTS

| | | | | |
|---|---|---|---|---|
| EP | 1931006 A1 * | 6/2008 | ................ | F16L 3/13 |
| GB | 2222113 A * | 2/1990 | ............. | B42F 13/10 |

* cited by examiner

*Primary Examiner* — Sam Yao
*Assistant Examiner* — Jennifer L Korb
(74) *Attorney, Agent, or Firm* — Workman Nydegger; Randy Shen

(57) ABSTRACT

A teaching aid has visual indicia thereon simulating the circulatory system of an organism. The teaching aid includes (i) a template having visual indicia thereon simulating the circulatory system of an organism; and (ii) a plurality of connectors for connecting a medical device to the template. The template comprises (a) a base, and (b) visual indicia on the base, simulating the circulatory system of an organism.

31 Claims, 17 Drawing Sheets

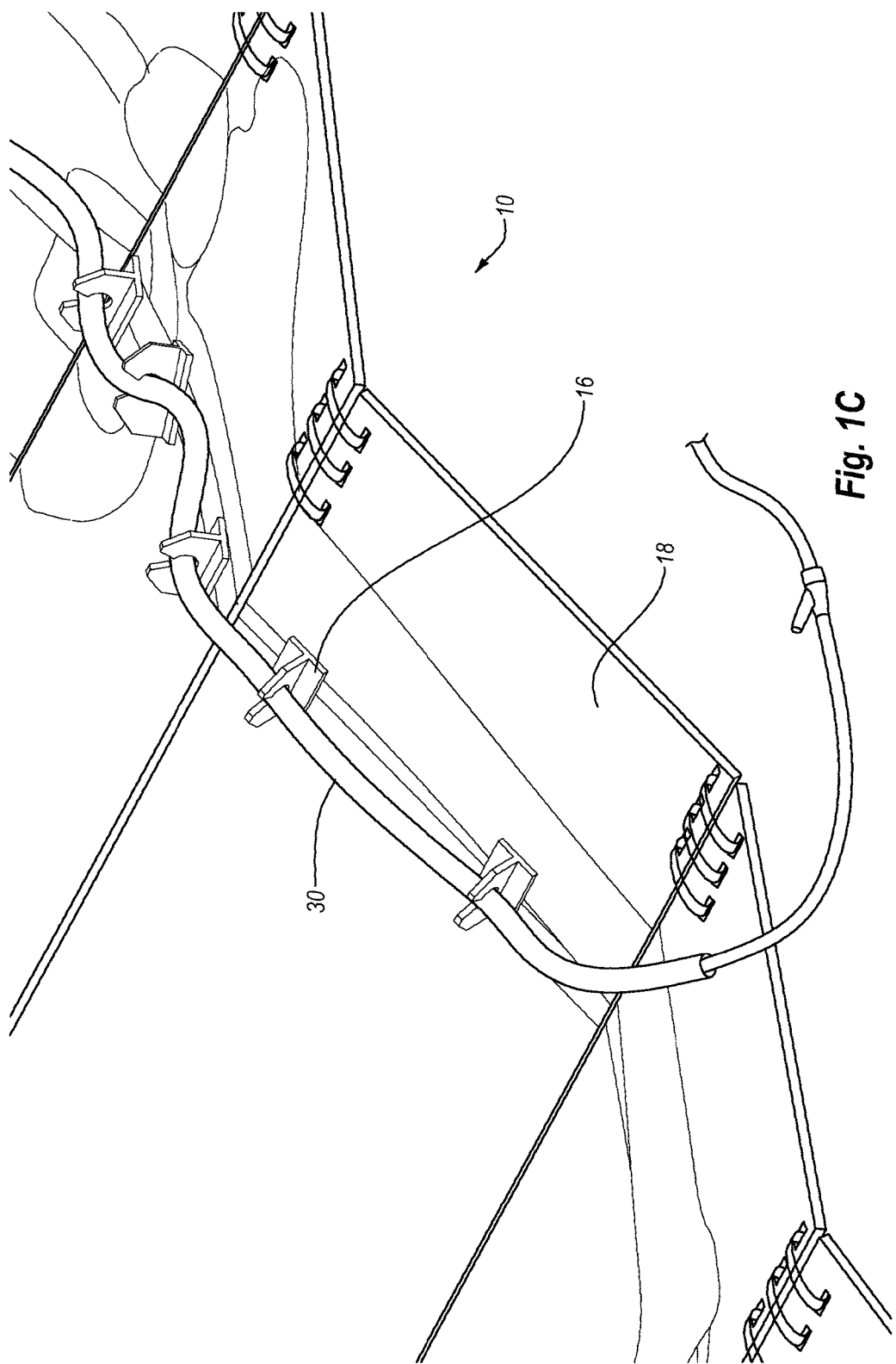

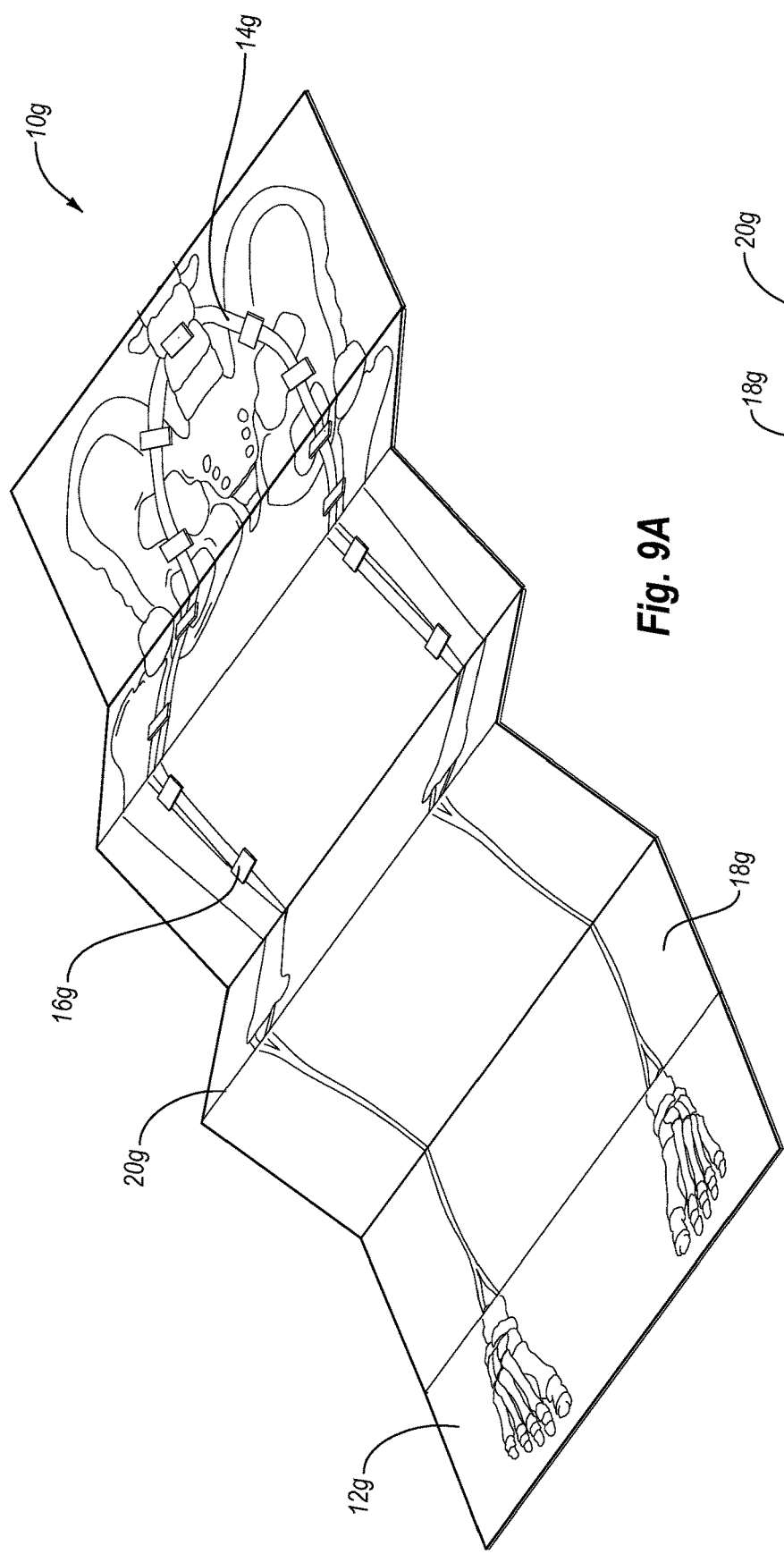
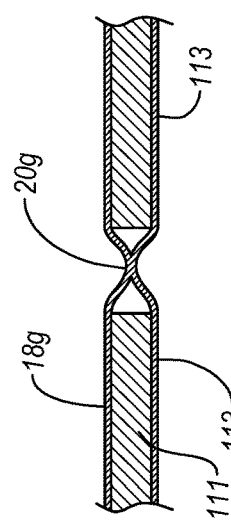
Fig. 9A
Fig. 9B

METHODS, SYSTEMS AND KIT FOR DEMONSTRATING MEDICAL PROCEDURE

BACKGROUND OF THE INVENTION

1. The Field of the Invention

This invention is in the field of medical teaching or demonstrating devices.

2. The Relevant Technology

Catheter assemblies are widely used in the field of medicine in order to treat various physical ailments, including heart problems, circulatory system problems, coronary artery disease, plaque buildup, stenosis, and a wide variety of physical conditions that can be treated through the use of catheters and catheter procedures. It is important that the medical staff involved in the catheter procedure understand and have the skills necessary in order to treat sensitive medical conditions.

Since it is the best practice to understand catheter equipment and the anatomical location of structures within the body prior to performing a medical procedure using a catheter system, it is useful to employ teaching aids that will provide training to physicians and technicians prior to actual patient procedures in a hospital setting.

However, existing teaching aids are often cumbersome, heavy, expensive, and are difficult to assemble and use. It is desirable to provide an improved method for teaching catheterization techniques and for readily identifying anatomical features and ways in which a catheter assembly can be used to treat artery disease.

BRIEF SUMMARY OF THE INVENTION

The present invention relates to a teaching or demonstration aid with visual indicia simulating the anatomy of an organism, including the circulatory system of an organism. An embodiment of the aid of the present invention comprises: (i) a template having visual indicia thereon simulating the circulatory system of an organism; and (ii) a plurality of connectors for connecting a medical device to a template. The connectors are mounted adjacent a path formed by the indicia simulated in the circulatory system such that by placing a medical device within the connectors the medical device will travel along the path simulated by the indicia, i.e. simulating movement of the medical device within the circulatory system. The medical device can be connected to the template and then used for teaching or demonstrating to physicians, medical students and technicians on how to use the medical device in a patient setting.

The template of the present invention comprises a base having visual indicia thereon. The base comprises one or more panels and can be made from a variety of different materials. In one configuration of the invention, the base comprises a plurality of panels that are flexibly, movably coupled to each other and can be folded with respect to each other. In one such embodiment, a waterproof cover, such as a plastic laminate, covers the panel sections, and acts as a connector for connecting the panel sections. Optionally, the panels can be made from a water proof material, such as plastic. In an alternative embodiment, the panels are connected through the use of spiral binding, wires, circular bands, or other substantially circular connectors, for example.

In one embodiment, the foldable, substantially flat base or template of the present invention can easily be transported since it is a foldable flat assembly made out of thin, lightweight materials that takes up very little physical space. It only takes a few seconds to set it up for use. It has anatomically accurate images that correspond to images of a human body, for example, which makes it clinically relevant and easy to use. In one embodiment, the aid of the present invention is made out of thin, light weight material with simulated human anatomy printed at a 1:1 scale on the surface of the template. Connectors are mounted adjacent the arterial path so that introducer sheaths, guiding catheters or simulated arterial tubes can easily be connected and removed in a manner simulating their use in a clinical setting.

In one configuration of the invention, an individual can directly visualize the aid, but it can also be configured with radiopaque ink or metal, outlining the arteries to make it usable with fluoroscopy equipment. The aid can be configured to be water proof so that it can be used in 37° C. water baths to simulate human body temperature.

The panel(s) of the base of the template may be comprised of a paper, cardboard, cardstock, foam, plastic, plastic sheet(s), wood, chipboard, fiberboard, inflatable materials or a variety of other substantially rigid materials, for example, that can receive visual indicia such as an ink or paint thereon. The visual indicia simulates the anatomy of an organism, such as the bone structure, circulatory system, organ systems, other anatomical features, and combinations thereof that are viewed and treated by a medical practitioner, such that a medical practitioner can practice using the teaching aid before performing procedures on live patients. The visual indicia may also be constructed or printed with a radiopaque material so that visualization can be made with x-ray or fluoroscopy equipment to further simulate the anatomy in a clinical, practical setting.

In addition, various types of simulated anatomical objects may be selectively connected to or mounted on the template such as tubes, polymer tubing, molded anatomical segments, trays containing tubes, trays containing water or objects containing curvatures simulating the anatomy of a patient and various other objects designed to simulate the patient's anatomy such that the training experience is more realistic. The simulations used with water can be equipped with circulatory pump systems that keep the water at 37° C. to simulate body temperature.

A kit of the present invention is comprised of a container, which can conveniently contain the teaching or demonstration aid in folded form, along with the connectors, simulated anatomical objects configured to be mounted on the aid, support assemblies (e.g., cushions and water trays), and catheter assemblies used in performing or demonstrating a procedure. Using the kit, a practitioner can conveniently demonstrate the use of the catheter assembly in a teaching, demonstration, or practical setting.

Thus, the present invention relates to an aid with visual indicia thereon simulating the circulatory system of an organism, the aid comprising: (i) a template having visual indicia thereon simulating the circulatory system of an organism, the template comprising a base and visual indicia on the base simulating the circulatory system of an organism; and (ii) a plurality of connectors for connecting a medical device to the template. The base comprises a plurality of panels connected together, wherein the panels are selectively moved with respect to each other. In one embodiment, the base comprises a substantially rigid material. The base may comprise a waterproof cover covering at least one panel section.

Various connectors may be used on the template, such as a hook, a tab having an aperture therethrough, a split tab, a pop-up tab, etc. One or more of the connectors may comprise a tab extending integrally from the base. One or more of the connectors may comprise a tab extending integrally from the base, the tab having a first end connected to the base and a free end that is initially coplanar with the base, but is selectively raised away from the base in order to position a medical device between the free end of the tab and the base. One or more of the connectors may comprise a tab extending integrally from the base, the tab having a first end connected to the base and a free end that is removably connected to the base. One or more of the connectors may comprise pop-up tabs having a first end having a scored surface adjacent the base and a second free end that is selectively moved with respect to the base. One or more of the connectors may be removably coupled to the template.

The connectors for connecting the medical device may be a variety of different kinds, for example, C-clamps, pop-up tabs, two-part connectors, comprising, e.g., VELCRO® hook-and-loop fasteners or magnets, temporary adhesives or adhesives that enable the connector to be repeatedly attached and removed (similar, e.g., to POST-IT notes), for instance, or a variety of different connectors that may be suitable for connecting medical devices to the template.

In one embodiment, a mounting platform is coupled to the template. Such a mounting platform may be a first attachment member (e.g., VELCRO® hook and/or loop, or a magnet) that is selectively coupled to a second attachment member on a connector or simulated anatomical object, for example. A simulated anatomical object and/or connector can thus be selectively coupled to the template. The aid may further comprise a radiopaque material, e.g., ink or wire on the template for increased visualization in an x-ray environment.

In one embodiment, the aid template is substantially planar and the aid may further comprise three dimensional support assemblies, e.g., cushions, that are selectively mounted to the substantially planar template to simulate a change in elevation from an elevation of the substantially planar base, or, as another example of a support assembly, a container for containing liquid to simulate use of a medical device in a liquid environment, for example. Multiple planar templates can also be connected together to simulate a three-dimensional anatomical feature. One template can be perpendicular to another template and/or multiple parallel templates can be mounted on top of one another to simulate an organism's three-dimensional anatomy, for example.

The visual indicia of the invention may also include text indicia for identifying an anatomical feature.

The template can further comprise a supplemental sheet having visual indicia that is substantially similar to the visual indicia of the base, wherein the supplemental sheet is coupled to the first base. A simulated anatomical object or support assembly is selectively mounted therebetween to simulate a patient setting. Simulated anatomical members may feature transparent top and/or bottom panels so that tubes therein simulating the circulatory system can be visualized. Optionally such simulated anatomical members may be opaque.

Another embodiment of a teaching or demonstration aid with visual indicia thereon simulating the circulatory system of an organism comprises: (i) a template having visual indicia thereon simulating the circulatory system of an organism, the template comprising: a base comprising a plurality of panels and visual indicia on the plurality of panels simulating the circulatory system of an organism; and a waterproof cover for covering the plurality of panels; and (ii) a plurality of connectors for connecting a medical device to the template. The panels may be selectively moved with respect to each other.

One embodiment of a teaching or demonstration aid of the present invention comprises an apparatus comprising: (i) a plurality of visual display members (e.g., panels) flexibly interconnected together, each of the plurality of visual display members illustrating a portion of an anatomy of an organism; and (ii) a plurality of tabs extending from a surface of at least one visual display member of the plurality of visual display members and being disposed adjacent a display of certain simulated elongated vasculature of the anatomy of the organism, each tab of the plurality of tabs being configured to receive a medical device disposable within the anatomy of the organism.

At least one radiopaque marker may be formed on the plurality of visual display members, such as at least one radiopaque marker formed on a simulated artery. The least one radiopaque marker may be a wire extending along a length of a portion of the elongated vasculature or a radiopaque coating on at least a portion of the elongated vasculature, for example.

In one embodiment, each tab of the plurality of tabs includes an opening and a slit, the slit communicating with the opening and the opening being configured to receive the medical device. Furthermore, each tab may be a flexible member with a first portion on one side of the slit and a second portion on another side of the slit being moveable independently to allow passage of the medical device. A water-proof cover may extend over various panel sections to form the plurality of visual display members, wherein the water-proof cover forms the flexible connection between adjacent visual display members of the plurality of visual display members.

A support assembly is selectively positionable relative to at least one visual display member of the plurality of visual display members. One support assembly is configured to position the at least one visual display member and at angular orientation relative to at least an adjacent visual display member. The support assembly may includes a curved profile and/or an inclined profile and may include an attachment member, such as a magnet or a portion of a VELCRO® hook-and-loop fasteners attachment assembly to connect the at least one visual display member to the support assembly.

The invention may further comprise a plurality of simulated anatomical objects, such as simulated vascular objects selectively coupled to at least one of the plurality of visual display members. The plurality of simulated vascular structures may include open structures, restricted structures, obstructed structures, and bifurcated structures, for example. The plurality of simulated vascular structures may include structures to simulate lesions, occlusions defects, or other structures of a vasculature, for example.

In one embodiment, the plurality of visual display members are configured to be folded one on top of another in a concertina fashion. Thus, the plurality of visual display members can be configured to be folded one on top of another sequentially, with an end visual display member overlapping the other folded visual display members. Indicia may be employed for identifying specific structures of the portion of the anatomy of the organism.

In certain embodiments, the medical device and/or simulated anatomical objects have certain properties at body temperature of about 37° C. In other embodiments, the kit includes a modified medical device and/or simulated anatomical objects having certain properties at ambient temperature that approximate certain properties at the body temperature of about 37° C.

In one embodiment, a method for demonstrating a use of a medical device is described. The method includes positioning a teaching aid in preparation for demonstrating a use of a medical device. The aid includes a template having visual indicia thereon simulating an anatomical system of an organism. Following positioning the aid, a medical device is advanced. Following advancing the medical device, the use of the medical device is demonstrated. Optionally, the visual indicia can be included in a supplementary member that is disposed over the base.

The method can also include unrolling or unfolding the aid into a planar configuration, a non-planar configuration, or a combination of planar and non-planar configurations. For instance, the aid can have various angular orientations to approximate a desired anatomy.

In addition to the above, the method can include positioning a support assembly relative to the base, with the support assembly being a structure to change the angular orientation of the base or a supplemental member disposed on the base. Alternatively, the support assembly can be a water tray that accommodates at least a portion of the base or, more generally, the aid.

In still another configuration, the method can include positioning a plurality of connectors relative to the visual indicia and positioning at least one simulated anatomical object, optionally within at least one of the plurality of connectors. For instance, positioning the plurality of connectors relative to the visual indicia can include moving a movable end of a connector to expose an aperture configured to receive at least one of the medical device and at least one simulated anatomical object, optionally through splitting a slit formed in the moveable end to position the at least one of the medical device and the at least one simulated anatomical object into the aperture.

In another embodiment, positioning the plurality of connectors includes attaching a connector to a portion of the base so that the connector can position the at least one of the medical device and the at least one simulated anatomical object in alignment with the visual indicia.

In still another embodiment, the teaching or demonstration aid can be positioned to form one or more contours with the base, the one or more contours simulating a clinical environment for use of the medical device. These one or more contours include attaching a portion of the base to itself to form the one or more contours, such as bottom side of the base to itself, for example.

In still another embodiment, the method can include advancing the medical device comprising advancing the medical device through one or more connectors and/or through one or more simulated anatomical object and/or through one or more simulated anatomical object disposed within one or more connectors.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 1C is a close-up view of a portion of the embodiment of the teaching aid of FIG. 1B having a catheter assembly mounted thereon.

FIG. 6 further shows embodiments of connectors and simulated anatomical objects, which have a second member of the two-part attachment assembly thereon for attachment to the mounting platforms and can thus be selectively coupled to the template of the teaching aid.

FIG. 9A is a view of yet another alternate embodiment of a teaching aid of the present invention. FIG. 9B is a cross sectional, cutaway view of a joint of the embodiment of the teaching aid of FIG. 9A.

DETAILED DESCRIPTION OF THE PREFERRED EMBODIMENTS

Figure 1A:
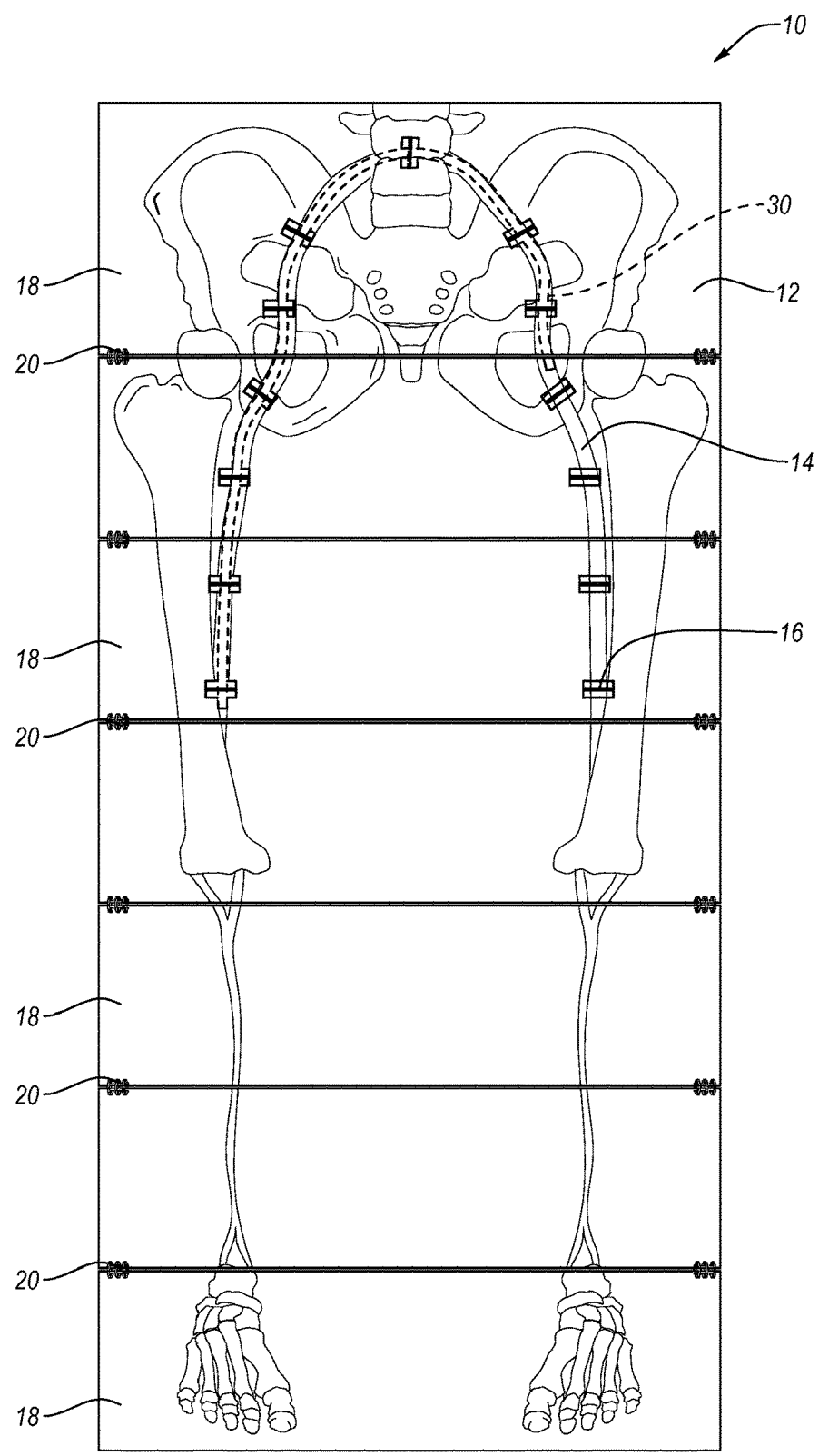
FIG. 1A is a top view of an embodiment of a teaching aid of the present invention, showing a template having visual indicia thereon, simulating the circulatory system of an organism and connectors for connecting a medical device to the template.
Figure 1B:
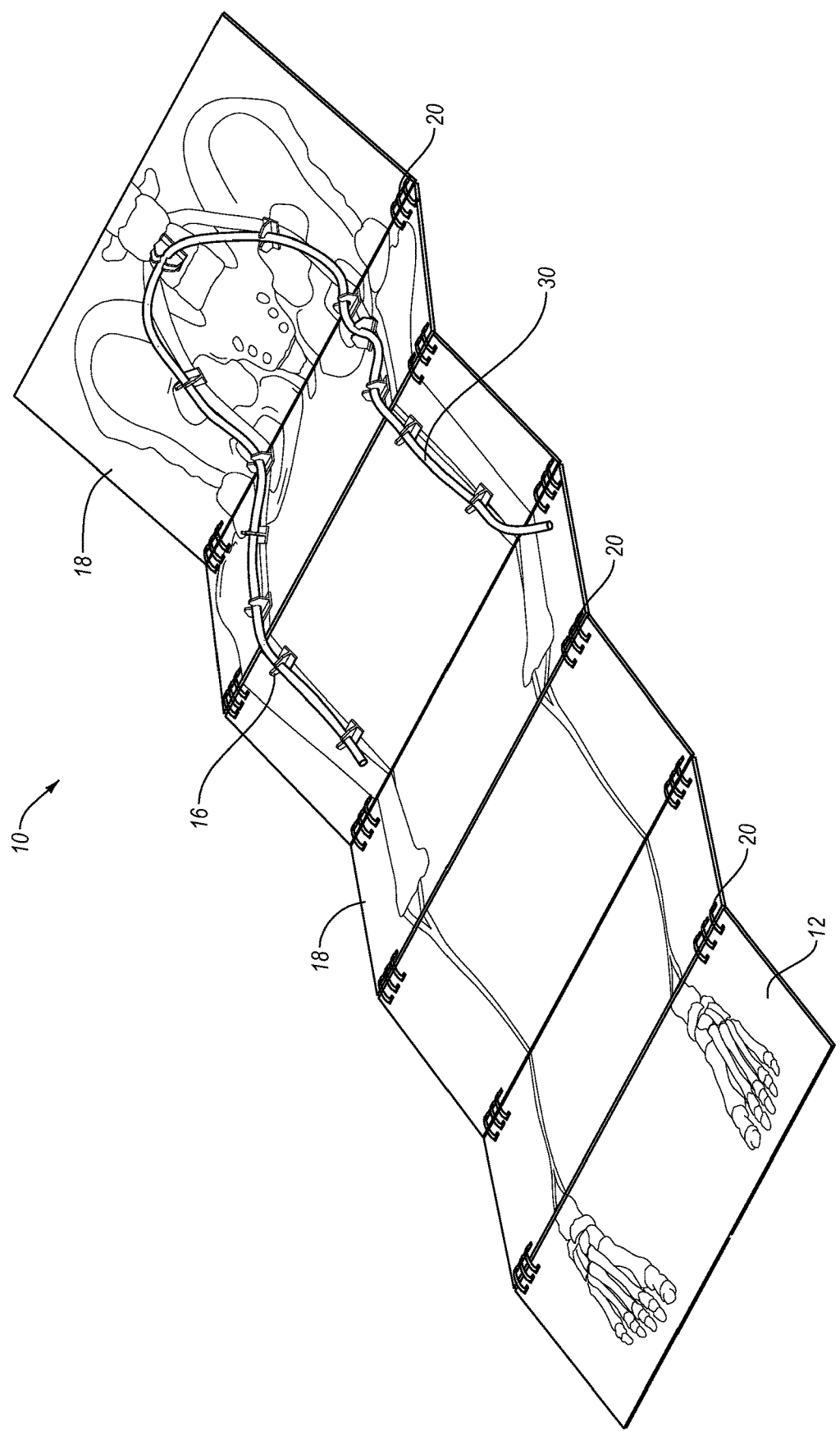
FIG. 1B is a perspective view of the embodiment of the teaching aid of FIG. 1A wherein the teaching aid is in a bent, partially folded position.

FIG. 1A shows an example of an embodiment of a teaching aid 10 or apparatus of the present invention. Teaching aid 10 comprises: (i) a template 12 having visual indicia 14 thereon simulating the circulatory system of an organism, and (ii) a plurality of connectors 16 for connecting a medical device to the template 12. FIG. 1B is a perspective view of the embodiment of the teaching aid 10 in a bent, partially folded position. Teaching aid 10 can be further a compressed accordion-style so as to be placed in a container for convenient storage, for example. FIG. 1C is a close-up view of a portion of the embodiment of the teaching aid 10 of FIGS. 1A-B having a catheter assembly mounted thereon. Connectors 16 mounted on template 12 connect a medical device and/or simulated anatomical objects to the template 12 and position the medical device and/or simulated anatomical relative to visual indicia 14, such as in alignment with the visual indicia. A medical device can be placed on teaching aid 10 to thereby train or demonstrate to a medical practitioner the use of such medical device.

Template 12 comprises an elongate base comprised of a plurality of panels 18 movably connected by panel connectors 20, which in FIG. 1A can be circular shaped wires, circular bands, spiral bindings, other substantially circular connectors, for example, which movably, flexibly, join panels 18 together in a hinged relationship. In another embodiment, a single panel forms the whole base with holes, slots, or creases formed in or through the single panel to create a hinged relationship between adjacent portions of the base. Thus, one or more panels can form the base of the present invention. In the embodiment of FIGS. 1A-C, template 12 comprises a base comprising of a plurality of panels 18 that are connected to and selectively movable with respect to each other and can be folded with respect to each other in an accordion-style. Template 12 can be configured so as to be substantially flat or planar as shown in FIG. 1A, or can be bent as desired to simulate an anatomical environment.

As further shown in a phantom view in FIG. 1A and also in non-phantom view in FIG. 1C, a catheter assembly 30 is shown mounted in connectors 16 such that the catheter can be used in simulating, teaching how the catheter is used on a live patient. In other embodiments, other devices may be bounded in the various connectors described herein. For example, such devices may include a catheter assembly, a catheter, a medical device, other devices, simulated vasculature, other simulated anatomy (as described herein), or the like.

Visual indicia 14 of FIG. 1A simulate a femoral artery such that a medical practitioner can learn and practice use of catheters or other medical devices for treating such an anatomical feature. A variety of different types of indicia may be used such as circulatory features of the chest, arms, head and neck, abdominal cavity and various other features and anatomical regions of a human being, animal or other organism. Although circulatory features are generally described herein, other anatomical features may be simulated. For example, gastrointestinal features such as esophageal, stomach, intestinal or other gastrointestinal features may be represented. In another embodiment, neurological features can be illustrated. In still another embodiment, cardiovascular features, including pulmonary features can be illustrated. All of these features, and other anatomical features or structures may be used to aid with demonstrating or teaching a practitioner in the use of medical devices that would be used in vivo.

Teaching aid 10 can be folded at the panel connectors 20 for convenient storage and/or for simulation of an anatomical region that is higher or lower with respect to one another. Thus, the use of a plurality of panels 18 that is movable with respect to each other when forming template 12 provides portability, convenient storage, and diversity of use.

Various embodiments of bases of the present invention which form templates of the present invention may be employed, and various forms of connectors may be employed, as further discussed herein.

Panels 18 may be formed by laminating a paper or cardboard section with a plastic material, for example, to form a panel comprised of laminated paper or cardboard. In one embodiment, panels 18 of the base are comprised of a substantially rigid material comprising cellulose and/or a cellulose derivative, such as paper, paperboard, cardboard, cardstock, wood, or fiberboard that can receive visual indicia such as an ink, paint, or dye or other indicia thereon. The one or more panels of a base of the present invention can optionally comprise a plastic, metallic, foam, inflatable, or other material The base may optionally comprise a variety of different materials which may be flexible, rigid, semi-rigid or a variety of different combinations so long as they can retain visual indicia and receive connectors.

Each of panels 18 is an example of a visual display member. Thus, panels 18 are examples of visual display members flexibly interconnected together, each of the plurality of visual display members illustrating a portion of an anatomy of an organism. The plurality of connectors 16 that extend from the surface of at least one visual display member of the plurality of visual display members are disposed adjacent circulatory system indicia 14, which is an example of a display of certain elongated vasculature of the anatomy of the organism. Each connector 16 is configured to receive a medical device 30 therethrough such as a catheter, which is configured to be disposed within the anatomy of the organism.

The visual indicia 14 simulate the circulatory system of an organism such that a medical practitioner can practice using the teaching aid before performing procedures on live patients. The visual indicia 14 may be comprised of a variety of different inks, having a variety of different colors, for example. The visual indicia 14 may also be radiopaque, optionally radiopaque in certain locations, such that under x-ray or similar settings the radiopaque material will show up more distinctly to simulate the use of radiopaque materials in a procedural setting. As shown in FIGS. 1A-C and in FIGS. 2-13, one or more of the connectors of the present invention are mounted adjacent a path formed by the indicia 14 simulating the circulatory system, such that as a practitioner places a medical device within the connectors, the medical device follows the path formed by the indicia 14 simulating the circulatory system. Thus, use of connectors mounted adjacent the path formed by indicia 14 enables a user to practice placing a medical device within the circulatory system. While the connectors and other objects, structures, or features described herein are described as being mounted adjacent the path, it should be understood that those connectors and other objects, structures, or features can be mounted near, beside, on, over, under, or partially or completely overlapping the path and that those positions and orientations are also considered to be adjacent the path.

Connectors 16 comprise split tab connectors that may be attached to respective panels 18 through the use of an adhesive, for example, or may be integrally connected thereto. Connectors 16 are mounted adjacent a path formed by the indicia 14 simulating the circulatory system. Optional connectors that may be mounted on template 12 of teaching aid 10 adjacent the path formed by the indicia 14 simulating the circulatory system include the connectors described and shown herein with reference to FIGS. 2-14, for example. Thus, optional connectors will be discussed in additional detail below.

The visual indicia 14 can be placed on the panels of the base in a variety of different manners. In one embodiment, the indicia are embossed on the panels during the printing process to form a three dimensional appearance that enhances the ability of practitioner to see the simulated path of the circulatory system. Printing, dying, painting, drawing, laser etching and a variety of other techniques may be employed in order to enhance the appearance and/or to create three dimensionality on the panels. Laser etching may be employed to create a three dimensional appearance. In such embodiments the panels may be comprised of a paper, plastic, cardboard, or chipboard material, for example. In yet another embodiment, instead of thin, flat panels, the panels are thicker and the indicia can be etched into such a thicker, light-weight material block creating a three dimensional look. The appearance of the arteries can be laser cut, for example.

In another embodiment, the indicia showing the anatomy can optionally be etched into a light-weight material block creating a three dimensional appearance. The arteries or anatomy can be laser cut with a side hole to receive an introducer sheath that is disposed through the side hole insertion to provide access to the anatomy for performance of the simulated procedure. Indicia representing the anatomy of a patient may optionally be printed on a plastic waterproof material.

Figure 2:
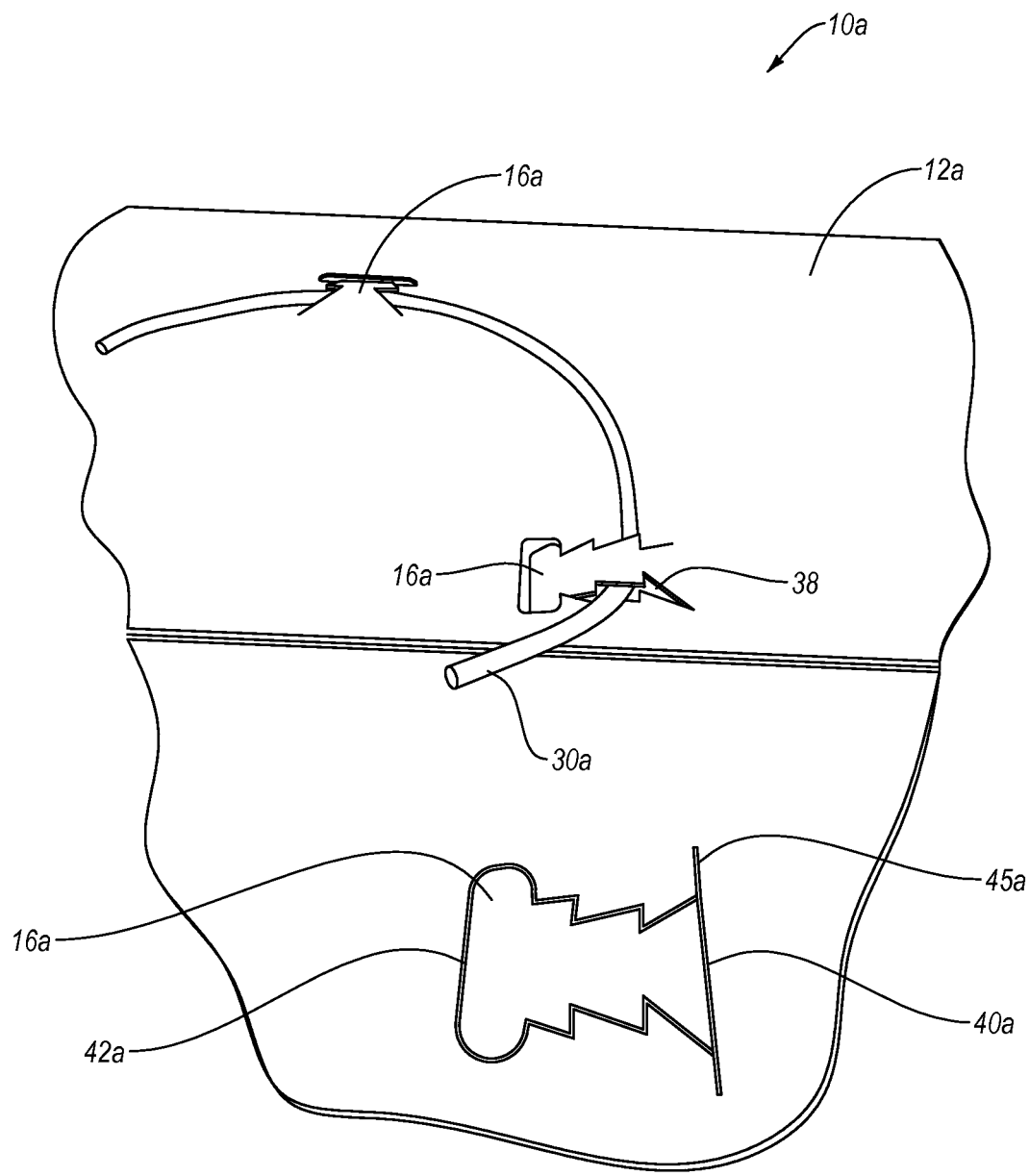
FIG. 2 is a view of an alternate embodiment of a teaching aid having alternate connectors.

FIG. 2 is a view of an alternate embodiment of a teaching aid 10a employing alternate connectors 16a to form a template 12a upon which a medical device such as catheter 30a can be mounted for simulating a medical procedure. As shown with reference to FIG. 2, various different types of template connectors can be used in the present invention. FIG. 2 shows a teaching aid 10a having pop-up template connectors 16a that are integrally attached to template 12a and can be selectively peeled out of template 12a and raised in order to form a hole 38 through which catheter 30a can be selectively placed.

Connectors 16a are in the form of pop-up tabs have a connection portion 40a which is connected to template 12a and which may be scored with an indentation 45a as shown in FIG. 2, for example, in order to provide flexibility, and a movable portion 42a which is either cut out of template 12a or is perforated at the edges thereof in order to allow movable portion 42a to be easily moved from the flat position and raised in order to receive medical device 30a therein. Such peelable tab connectors 16a lie flat within template 12a until desired to be moved. In the embodiment of FIG. 2, template 12a and integrally attached connectors 16a may comprise a cellulose-based material, such as paper, cardstock, or cardboard, for example.

Figure 3:
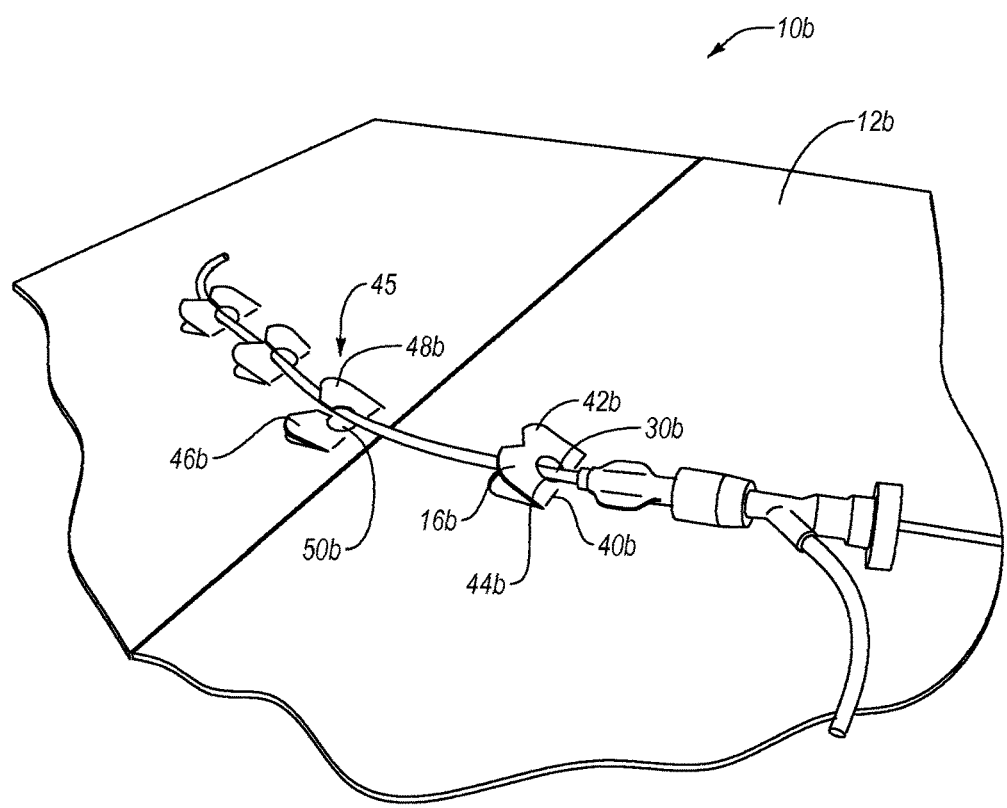
FIG. 3 is a view of another alternate embodiment of a teaching aid having alternate connectors.

FIG. 3 is a view of another alternate embodiment of a teaching aid 10b having alternate pop-up, peelable connectors which are integrally connected with the base of template 12b of the present invention. With reference to FIG. 3, tabs 16b of FIG. 3 are peelable or releasable from template 12b. Tabs 16b also have a connection end 40b and a movable end 42b and also have an aperture 44b extending through the tab 16b for placement of a medical device 30b therethrough. For instance, once the template 12b is positioned for teaching or demonstration the movable end 42b can be moved to expose or allow access to aperture 44b which receives the medical device 30b or a simulated anatomical object, as described herein.

Also as shown in FIG. 3, another embodiment of similar tabs, i.e., tabs 45, comprise first and second flexible, movable tab sections 46b, 48b with a slit therebetween which communicates with opening 50b in order to readily place medical device 30b into aperture 50b, also as shown in FIG. 3. Tabs 16b and 45 are convenient because they can be integrally formed and are readily useable by a practitioner. Aperture 50b, and aperture 44b described above, receives device 30b or other structures simulating the anatomy, i.e., simulated anatomical objects, therethrough. Tab sections 46b, 48b are movable independently from each other in order to allow passage of device 30b or other simulated anatomical objects through aperture 50b.

As shown in FIG. 3, a connector having a hole or aperture 50b therethrough may or may not have slits. In one embodiment tab 16b, i.e. not having slits, are employed such that medical devices and simulated anatomical objects can be extended through the aperture thereof without the use of slits. In other embodiments, connectors with slits are employed.

Figure 4:
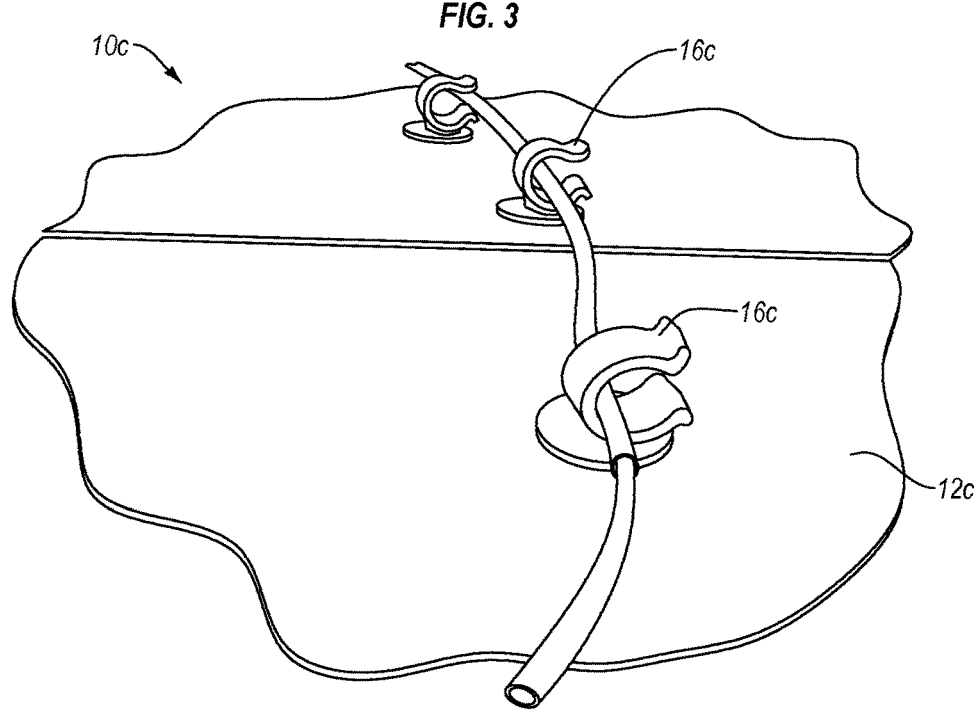
FIG. 4 is a view of yet another alternate embodiment of a teaching aid having alternate connectors.

FIG. 4 is a view of yet another alternate embodiment of a teaching aid 10c having alternate connectors. With reference now to FIG. 4, tabs 16c are examples of C-clamps that are used on template 12c of teaching aid 10c to receive the simulated anatomical objects or medical devices through the side opening of the C-clamp. The C-clamp 16c selectively retains the inserted simulated anatomical object or medical device during demonstration of the medical device and then selectively releases the inserted simulated anatomical object or medical device following demonstration. C-clamp 16c may be integrally formed on template 12c or may be mounted thereon with an adhesive, or magnetically or through the use of VELCRO® hook-and-loop fasteners or through a variety of other connection methods, such as a two-part attachment assembly described herein and known to those skilled in the art.

Figure 5:
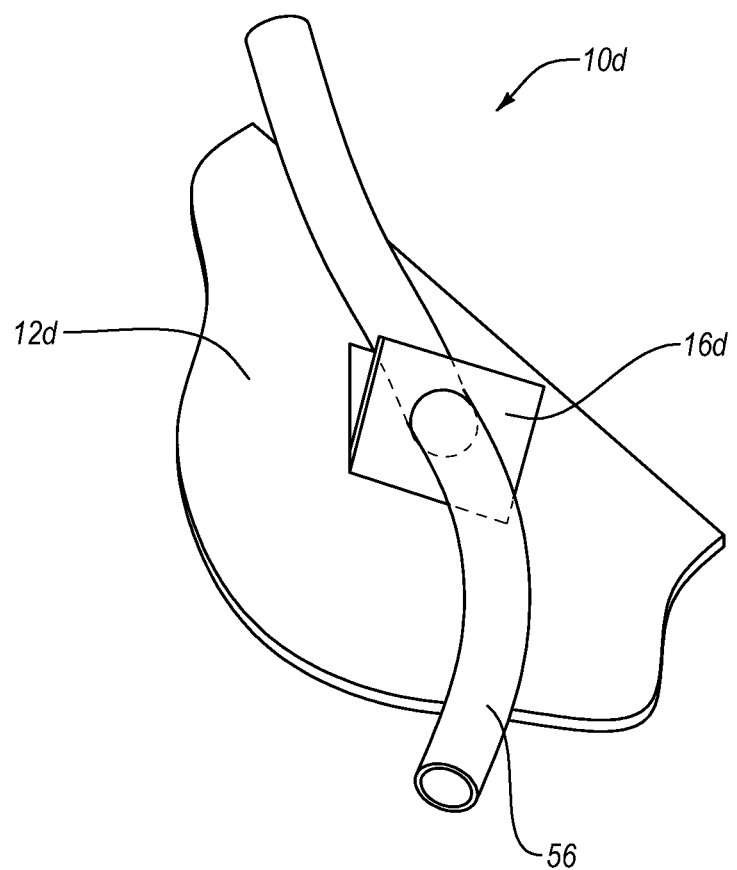
FIG. 5 is a view of yet another alternate embodiment of a teaching aid having alternate connectors.

FIG. 5 is a view of yet another alternate embodiment of a teaching aid 10d with integral pop-up connectors 16d on the template 10d thereof. Connectors 16d may be the same as or similar to connectors 16b and/or 45 or 42b of FIG. 3, for example. As an additional feature, template 10d of FIG. 5 has a simulated anatomical object in the form of tubing 56 that simulates an artery or vein of a circulatory system of an organism. This is an example of a simulated anatomical object coupled to template 12d through which a medical device such as a catheter 30 may be selectively extended to simulate a medical procedure. Tubing, sheaths, guidewires and other medical devices may optionally be placed through the connectors of the present invention to similarly simulate a patient procedure.

Figure 6:
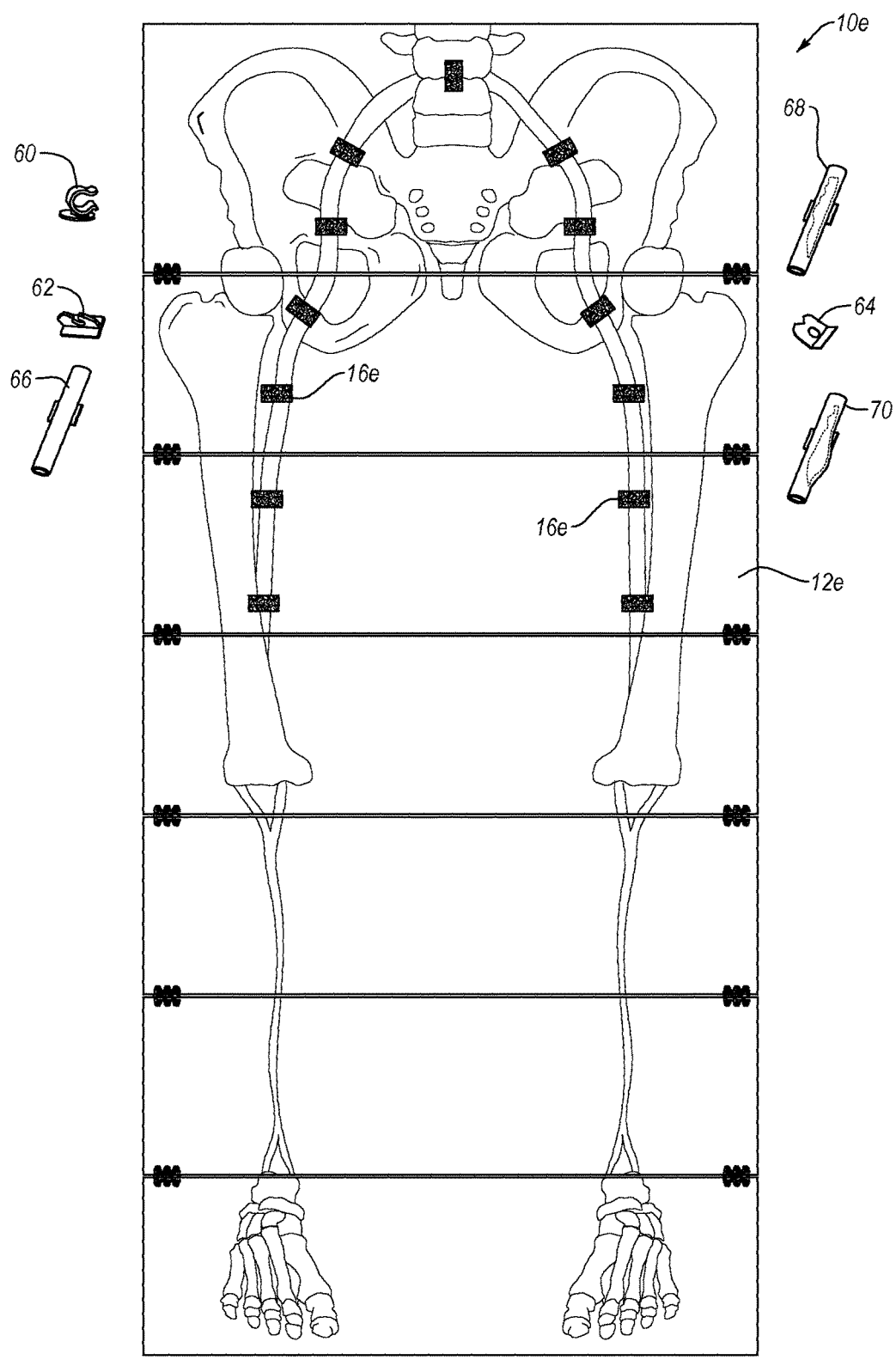
FIG. 6 is a view of yet another alternate embodiment of a teaching aid having mounting platforms thereon which are first members of a two-part attachment assembly (e.g., VELCRO® hook-and-loop fasteners).

FIG. 6 shows yet another embodiment of a teaching aid 10e wherein various selectively, removably mountable objects and connectors are selectively mounted onto mounting platforms 16e of teaching aid 10e. Mounting platforms 16e mounted on template 12e are examples of a first member of a two-part attachment assembly, e.g., hook and/or loop portions of VELCRO® hook-and-loop fasteners that selectively attach to corresponding pile and/or loop portions. FIG. 6 further shows selectively attachable connectors 60, 62, 64 and selectively attachable simulated anatomical objects 66, 68, 70, which have a second, mating member (e.g., loop and/or hook material) of the two-part attachment assembly thereon. Thus, connectors 60, 62, 64, and objects 66, 68, and 70 selectively couple to template 12e by selectively coupling to mounting platforms 16e through the use of VELCRO® hook-and-loop fasteners connections or other two-part attachment assembly connections. In another embodiment, an adhesive selectively connects connectors 60, 62, 64, and objects 66, 68, 70 to template 12e, for example.

Objects 66, 68, 70 can connect a medical device to template 12e and can receive a medical device therethrough for simulation of a medical procedure. Thus, objects 66 68, 70 and/or other tubular objects, act as connectors for connecting the medical device to template 12e, and also act as simulated anatomical objects. For example, simulated healthy artery 66 is selectively mounted on mounting platforms 16e such that artery 66 can selectively receive a catheter therethrough for training exercises. Similarly, simulated damaged arteries 68, 70 having simulated blockages or stenosis can be selectively mounted on mounting platforms 16e and receive catheters therein in order to retain the catheters on teaching aid 10e and simulate a medical procedure. Objects 66, 68, 70 are examples of simulated vascular objects since they simulate the vasculature of a patient. Other simulated vascular objects include other tubular objects or objects through which a catheter may be placed to simulate the placement of a catheter through the vasculature of a patient, for example. Although FIG. 6 illustrates each object 66, 68, and 70 connected to a single connector, in other configurations, objects 66, 68, and 70 can be connected to multiple connectors or be removably mounted or coupled to one or more connectors as device 30, for example, selectively mounts or couples to connectors 16 in FIG. 1B.

Figure 7:
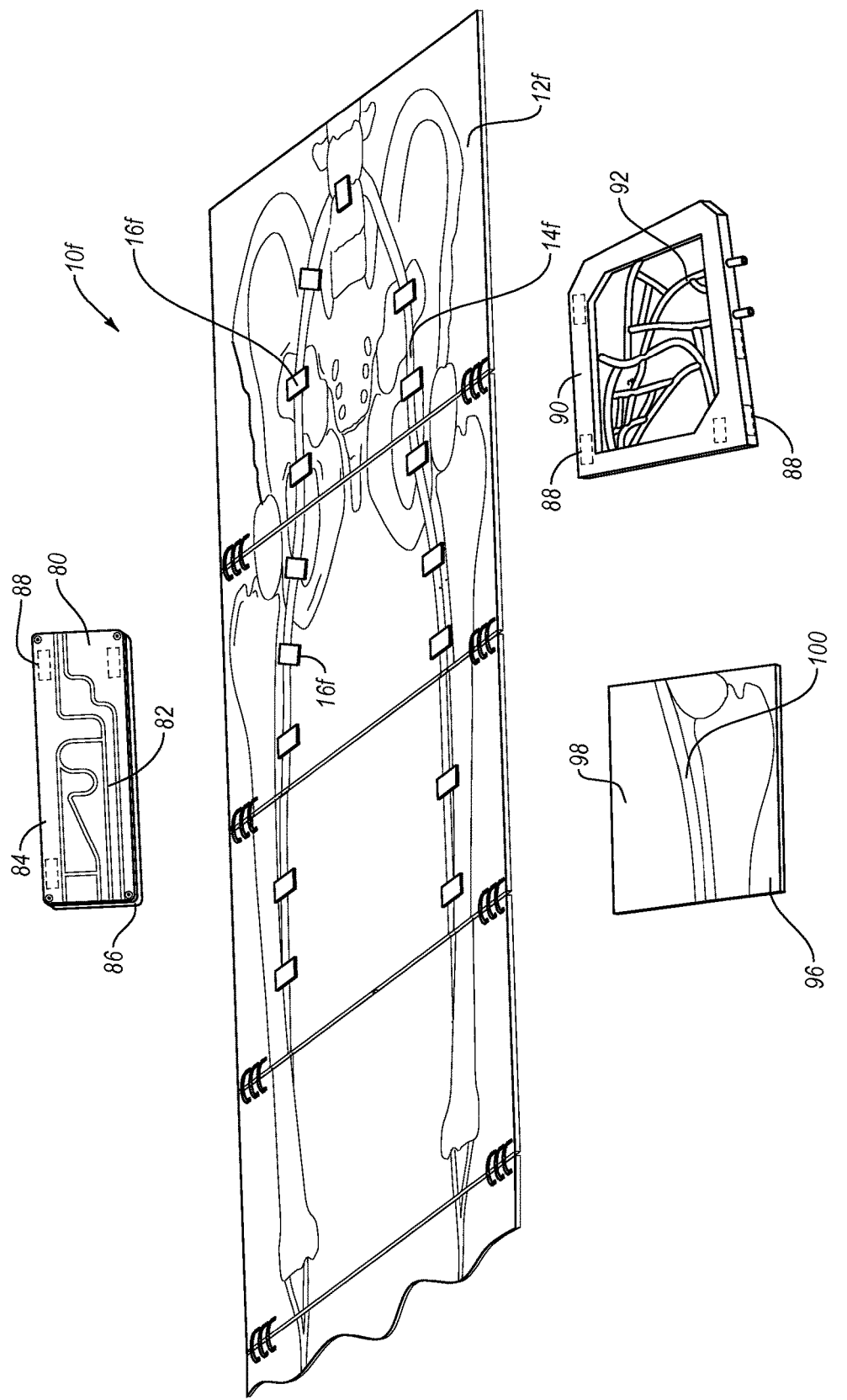
FIG. 7 is a view of yet another alternate embodiment of a teaching aid having mounting platforms (e.g., magnets) thereon, and further shows simulated anatomical objects which can be mounted thereon.
Figure 8:
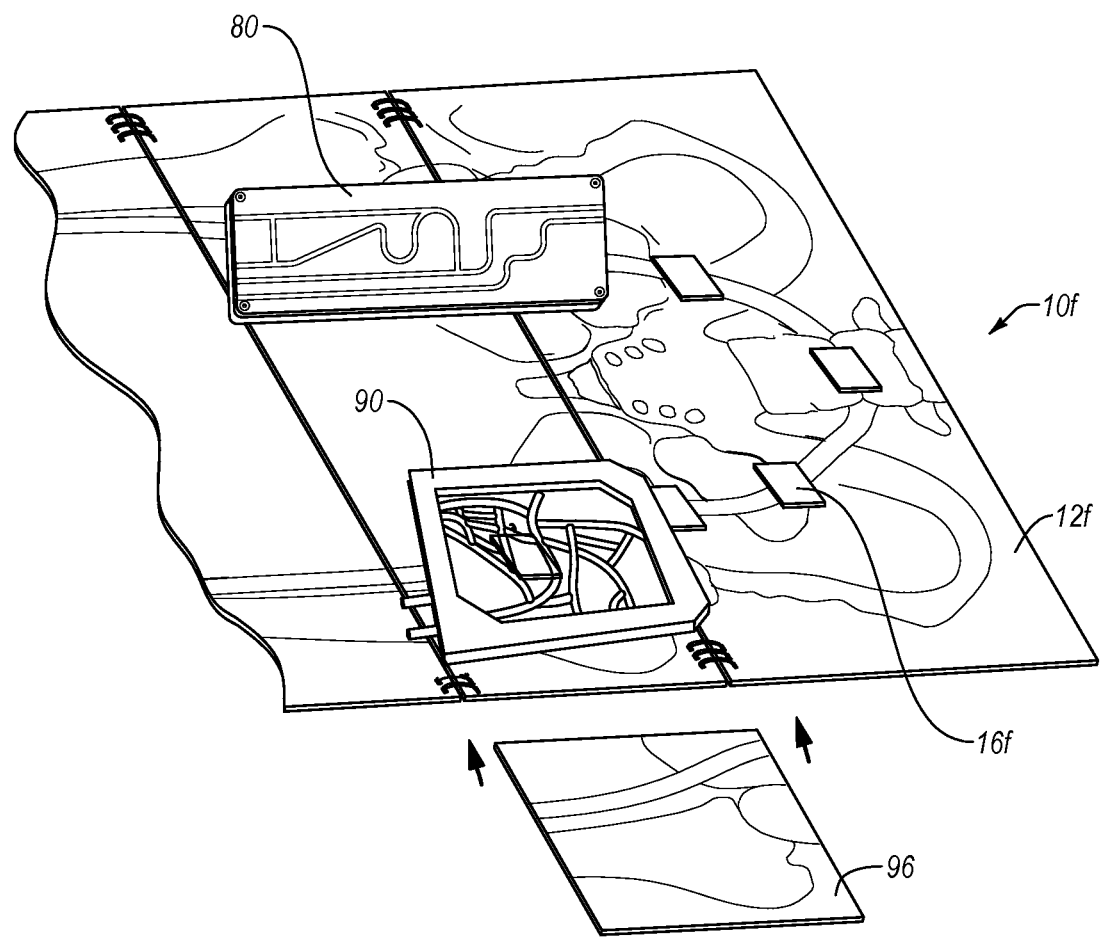
FIG. 8 is a view of the embodiment of the teaching aid of FIG. 7 with the simulated anatomical objects mounted of FIG. 7 mounted thereon.

FIG. 7 shows another embodiment of a teaching aid 10f having alternative mounting platforms 16f (e.g., magnets), which are further examples of first members of a two-part attachment assembly. FIG. 7 further shows simulated anatomical objects 80, 90 which have a second member 88 (e.g., a metallic object or another item attracted to a magnetic force) of the two-part attachment assembly thereon and which are selectively mounted on mounting platform 16f. FIG. 8 shows such simulated anatomical objects mounted on the embodiment of the template 12f of teaching aid 10f. While specific mounting platforms 16f and second members 88 facilitate mounting of the simulated anatomical objects 80, 90 to the teaching aid 10f, it can be appreciated that in alternate configurations the teaching aid 10f itself can be magnetic or be of a material that attracts or is attracted to another structure by a magnetic force, for instance, with a bottom portion or surface of the simulated anatomical objects 80, 90 being metallic or of a material that attracts or is attracted by magnetic force to another item, or vice versa. Further, it can be understood that adjacently positioned simulated anatomical objects 80, 90 can be removably coupled together by similar structures, i.e., magnets, material that attracts or is attracted by magnetic force, or other attachment structures, such as hook & loop fasteners, clips, etc.

FIGS. 7-8 show that teaching aid 10f can have simulated circulatory system objects 80, 90, such as the illustrated trays or structures 80, 90, or other simulated anatomical objects selectively mounted thereon in order to provide more anatomically correct examples and features for practice and teaching. Trays 80, 90 simulate the circulatory system of patient, for example.

Tray 80, for example, comprises an etched or tubing structure 82 simulating artery or vein portions formed or sandwiched by an upper transparent panel 84 and a lower transparent panel 86. By placing tray 80 on template 12f adjacent a path formed by the indicia 14f simulating the circulatory system, as reflected in FIGS. 7 and 8, a user can see the indicia 14f on template 12f simulating a circulatory system feature through the transparent panels 84, 86 and can simultaneously practice moving a catheter assembly through tubing 82. Thus, teaching aid 10f enables a practitioner to practice using tray 80 while visualizing the circulatory system of a patient.

Etched or tubing structure 82 may thus extend through the walls of tray 80 such that a catheter can be extended through tray 80 while the tray rests on teaching aid 10f adjacent indicia 14f. The teaching aid 10f shows a visual display of the circulatory features and the tray 80 provides a more anatomically correct environment through which a medical device such as a catheter may be extended. In this embodiment, the medical practitioner has the experience of seeing the anatomical features as well as providing a more anatomically correct environment for the movement of a medical device therethrough.

With reference to FIGS. 7 and 8, tray 90 similarly features tubing 92 simulating the circulatory system. In one embodiment, tray 90 is mounted on a portion of template 12f, after which supplemental visual indicia sheet 96 is placed adjacent tray 90, e.g., by being placed over tray 90 to form a stacked assembly as represented in FIG. 8.

Indicia 100 which is on template 98 of sheet 96 (template 98 of sheet 96 being comprised, for example, of paper or cardboard), corresponds to a portion of indicia 14f over which tray 90 is mounted. Thus supplemental sheet 96 is placed over tray 90, which is placed over template 12f such that the indicia 100 of sheet 96 are over the corresponding portion of indicia 14f with tray 90 therebetween. The use of supplemental sheet 96 having visual indicia 100 in connection with tray 90 and teaching aid 10f enables a practitioner to simulate the environment of a circulatory system by visualizing indicia 100, which corresponds to the same portion of indicia 14f over which tray 90 is mounted. The practitioner can thus see visual indicia 14f on the bottom of the stacked assembly, as well as visual indicia 100 on a corresponding top part of the stacked assembly. In one embodiment the supplement sheet 96 is selectively coupled to the template and/or the tray 90 or other simulated anatomical object.

The selectively mountable, simulated anatomical objects, such as tubes 66, 68, 70 of FIG. 6, and/or trays 80, 90 of FIGS. 7-8 are examples of simulated vascular objects and comprise tubing for simulating a portion of a circulatory system of an organism.

In one such embodiment, such tubing has a durometer and characteristics that behave in ambient room temperature as if they were in the human body at the temperature of the human body, i.e., 37° C. Thus, such simulated anatomical objects have certain properties at ambient temperature that approximate certain properties at the body temperature of about 37° C.

Alternatively, such simulated anatomical objects are designed to operate properly while in a temperature of 37° C., such that the durometer and characteristics of the tubing operate properly at the temperature of the human body, i.e., 37° C.

FIG. 9A is a view of yet another alternate embodiment of a teaching aid 10g of the present invention. FIG. 9B is a cross sectional, cutaway view of a joint of the alternate embodiment of the teaching aid 10g of FIG. 9A. FIGS. 9A-B show an embodiment of teaching aid 10g of the present invention comprising a template 12g comprising a base comprising a plurality of waterproof panels 18g movably, foldably connected to each other through the use of a plastic lamination process that forms a plurality of connection joints 20g between respective panels 18g. Visual indicia 14g simulates the circulatory system of an organism. Connectors 16g are examples of first attachment members that selectively connect to second attachment members (e.g., as part of a VELCRO® hook-and-loop fasteners attachment assembly) to thereby connect to selectively attachable connectors and/or other objects.

Template 12g is comprised of (i) a plurality of panel sections 111, (comprising, e.g., paper and/or cardboard, etc.) and (ii) laminating material 113 (e.g., plastic laminating material) laminated on the panel sections 111. Template 12g is formed by providing panel sections 111, then laminating panel sections 111 with plastic lamination material 113 to laminate the upper, lower, side and end portions of panel sections 111 and to further form joints 20g between sections 111, as reflected in FIG. 9B. Thus joints 20g comprise the same plastic laminating material 113 between panel sections 111 as is formed on the top, bottom, sides, and ends of sections 111.

Figure 14:
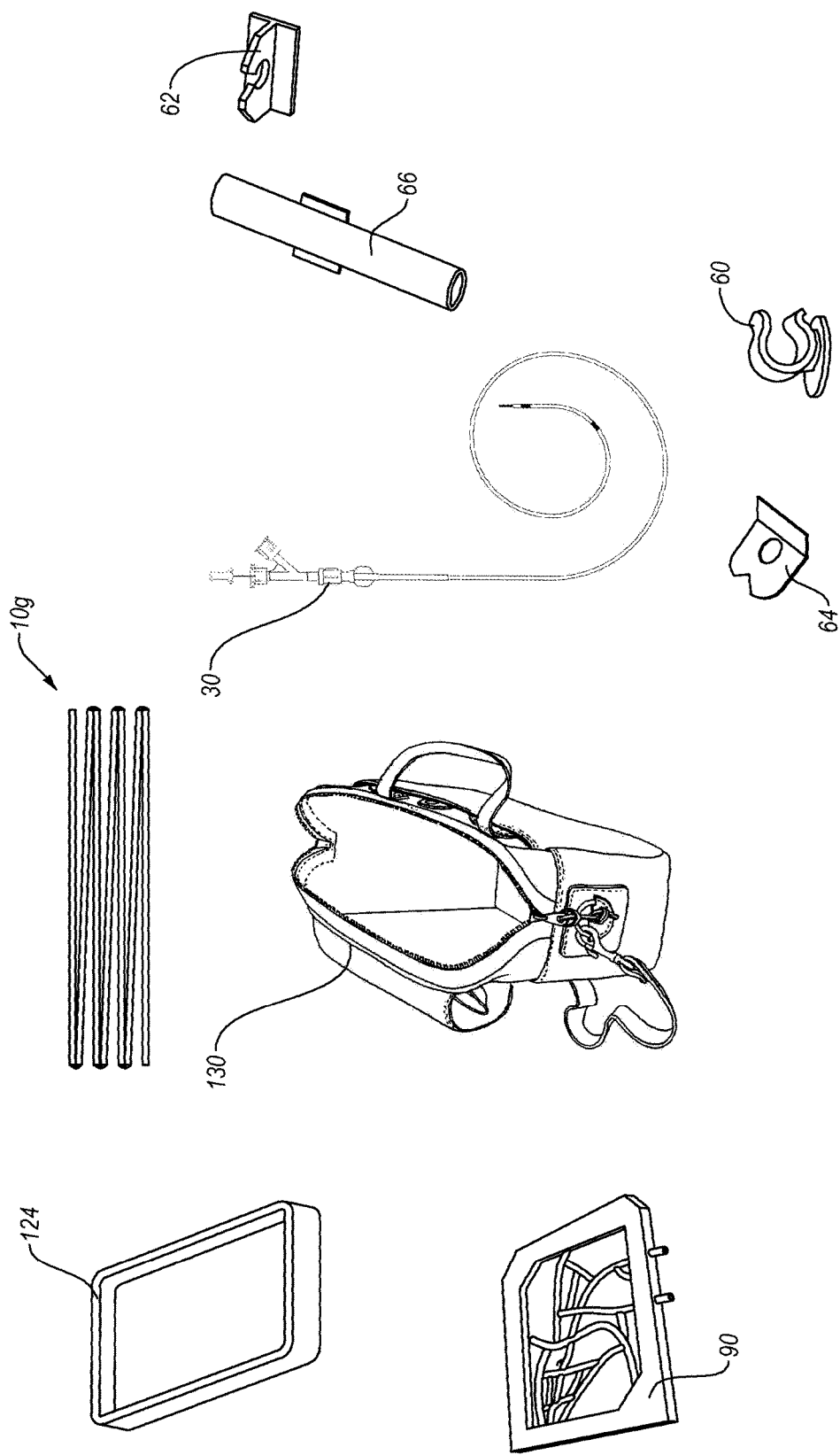
FIG. 14 is an embodiment of a kit of the present invention.

By laminating the upper and lower portions of each of the base panel sections 111 and providing the same lamination material in the joint 20g thereof, it is possible to form a laminated, waterproof assembly of panels 18g that are movably connected to each other and can fold in an accordion style on top of each other sequentially, with an end panel overlapping the other panels, as shown in FIG. 14. Plastic laminated teaching aid 10g, which comprises laminated panel sections and joints therebetween formed from the same material used to laminate the panels, is thus waterproof and can be folded conveniently for storage as shown in FIG. 14.

Figure 10:
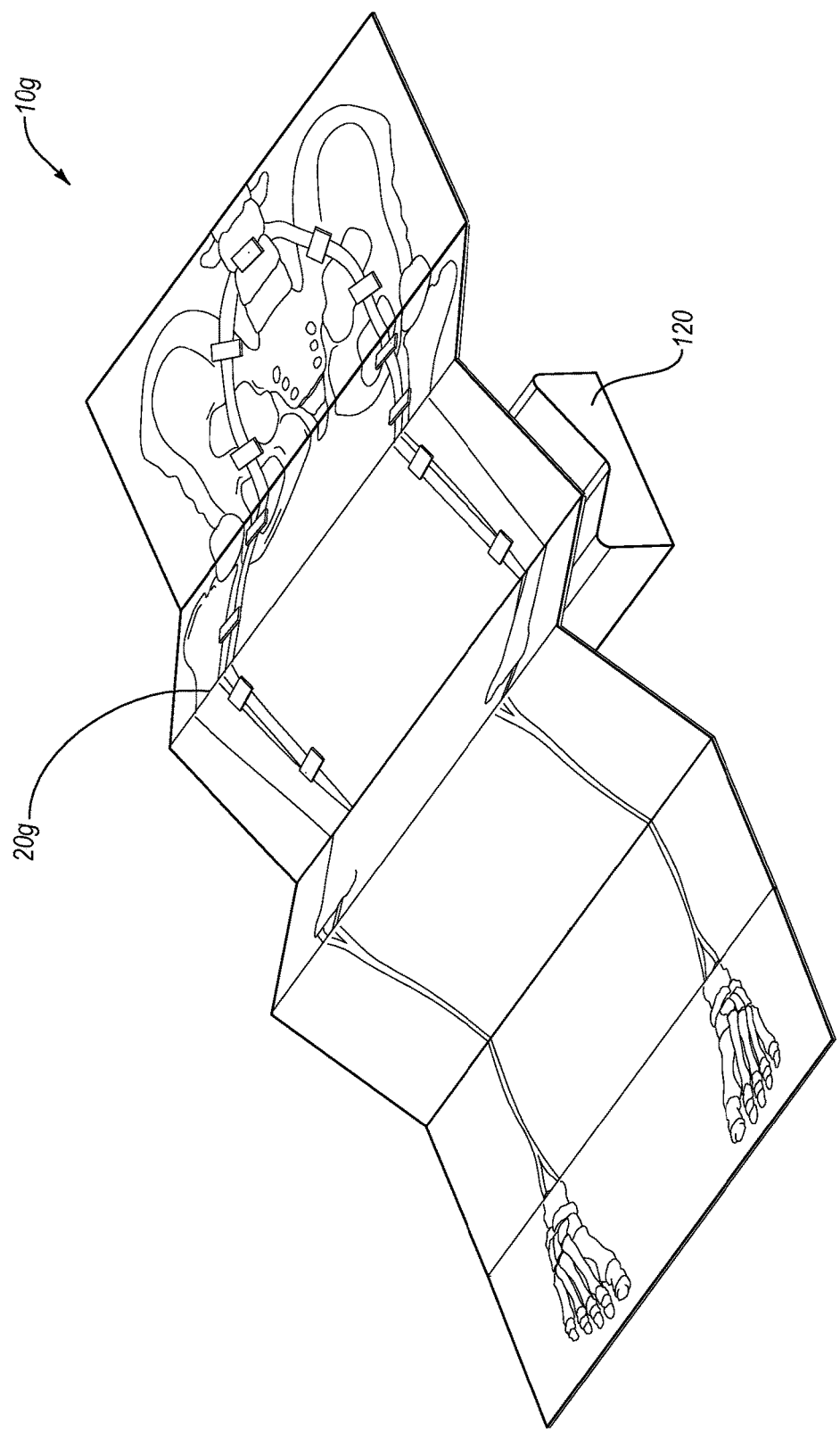
FIG. 10 is a view of the embodiment of the teaching aid of FIGS. 9A and 9B having a support assembly in the form of a cushion placed under a portion thereof to simulate a patient setting.

FIG. 10 is a view of the embodiment of a teaching aid 10g of FIGS. 9A and 9B in a partially folded configuration having a cushion 120 placed under a portion thereof in order to show anatomical contours, for example, for a particular training exercise. Cushion 120 is also an example of a support assembly that is selectively positionable relative to at least one visual display member (e.g., panel 18g) of the visual display members (e.g., panels 18g).

Figure 11:
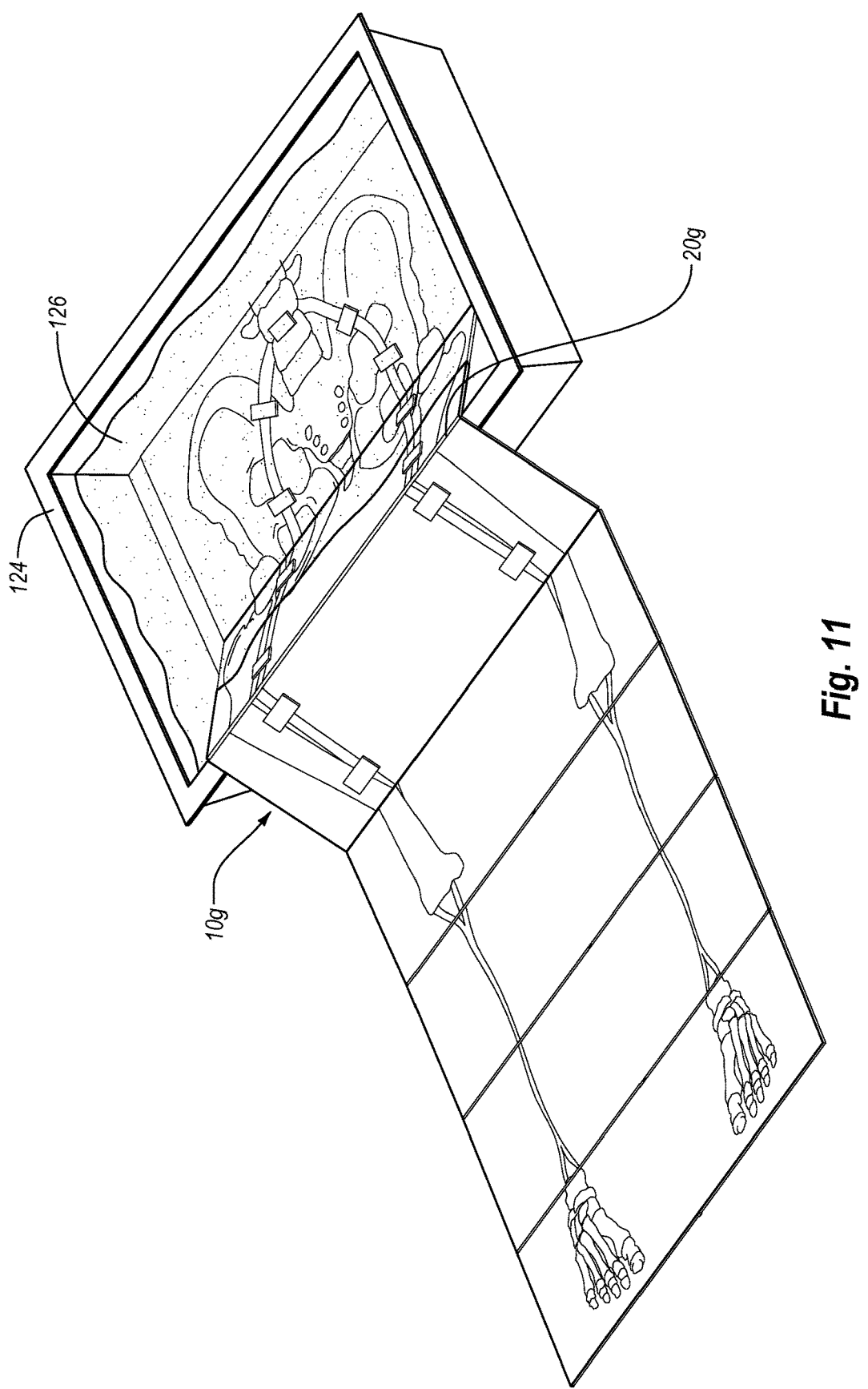
FIG. 11 is a view of the embodiment of the teaching aid of FIGS. 9A and 9B having a support assembly in the form of a water filled tray placed under a portion thereof.

FIG. 11 is a view of the embodiment of a teaching aid 10g of FIGS. 9A and 9B partially mounted within a support assembly in the form of a water filled tray 124 placed under a bent portion thereof to simulate an anatomical environment in which a container 124 of water 126 or other liquid receives one or more panels of teaching aid 10g therein in order to simulate use of teaching an aqueous environment, for example.

In one embodiment, a template of the present invention such as the templates shown in FIGS. 1-17B herein has sufficient rigidity such that it will move or translate into a desired configuration when oriented in a certain manner, similar to the use of a pop-up book. In one such environment, once teaching aid 10g is unfolded; template 12g pops into a desired configuration and orientation.

Figure 12:
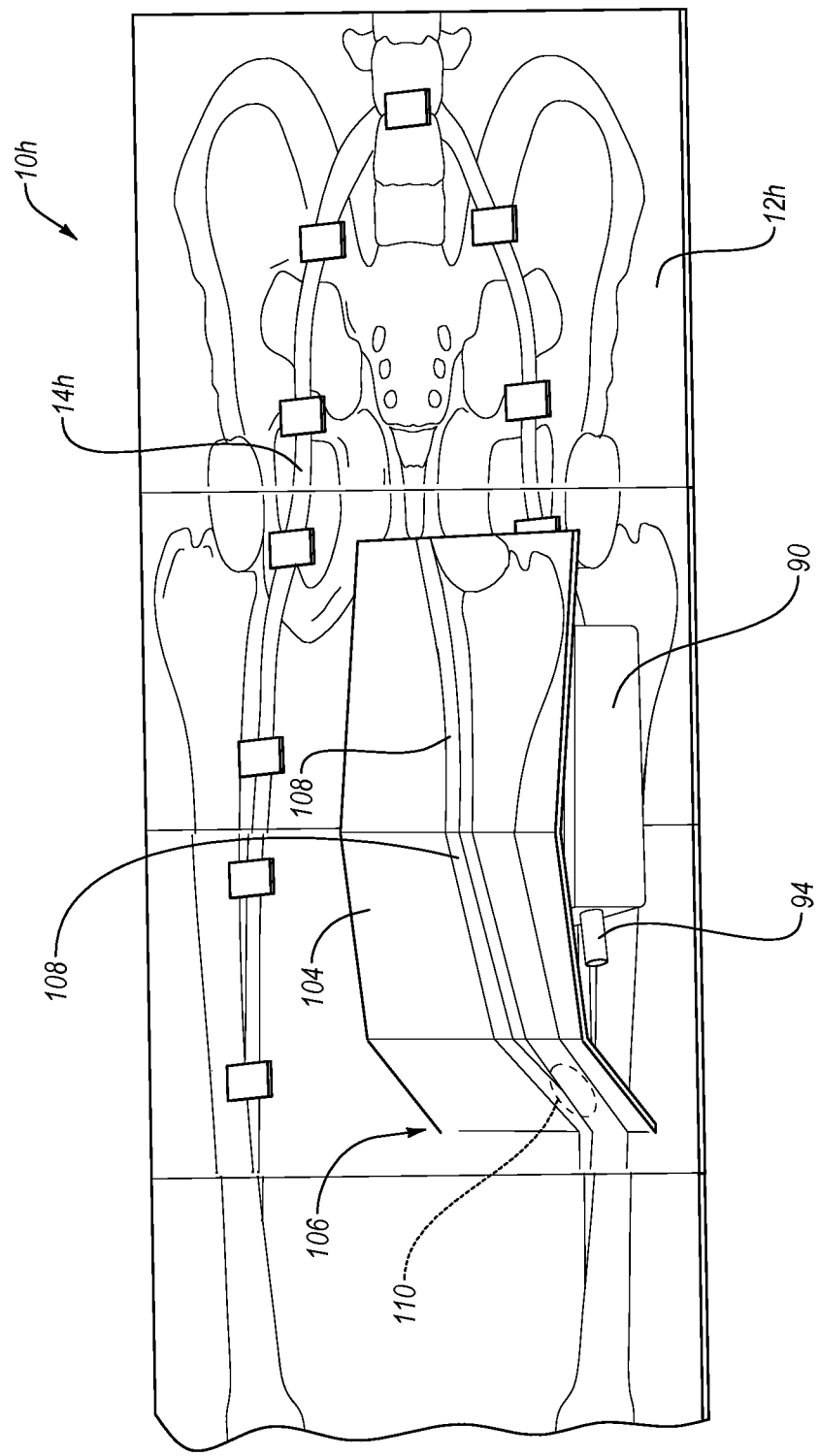
FIG. 12 is a view of yet another alternate embodiment of a teaching aid of the present invention having a supplemental flap for placement of a simulated anatomical object thereunder to simulate a patient setting.

FIG. 12 is a view of yet another alternate embodiment of a teaching aid 10h of the present invention having a supplemental visual indicia sheet 104 for placement of a simulated anatomical object thereunder. Supplemental visual indicia sheet or supplemental sheet 104 is integrally connected at a connection end 106 thereof to template 12h and has the same visual indicia 108 thereon as the visual indicia 14h of template 12h such that tray 90 can be placed thereunder and the practitioner can visualize the same indicia over tray 90 that is under tray 90. Thus, the use of corresponding indicia on supplemental sheet 104 and template 12h enables the practitioner to visualize the circulatory system under and over the tray 90. Alternatively, the position of supplemental visual indicia sheet 104 above the remainder of template 12h can be achieved through the movement or translation of structures between the supplemental visual indicia sheet 104 and the remainder of template 12h similar to a pop-up book where the opening movement of the panels raises the supplemental visual indicia sheet 104 above the remainder of template 12h.

Returning to FIG. 12, in one embodiment a practitioner can access tray 90 through the tubes 94 thereof by extending a catheter around supplemental sheet 104 and/or by extending a catheter through supplemental sheet 104. In one embodiment, supplemental sheet 104 has an opening 110 therein for extension of a catheter through supplemental sheet 104 into tray 90. In yet another embodiment, sheet 104 is free at end 106 thereof and is connected at the opposing end thereof onto template 12h for access to tubing 94 through end 106.

Thus, teaching aid 10h has on a base thereof a supplemental sheet 104 which has visual indicia 108 thereon corresponding to visual indicia 14h of template 12h. This supplemental sheet 104 can be used to form the top portion of the feature of simulated anatomy while the template 12h is used to feature the bottom portion of the simulated anatomy. Tray 90 or another object can be slid therebetween in order to provide a more anatomically correct display, showing a bump or a change in elevation from the elevation of template 12h. Tray 90 placed therebetween is an example of a simulated anatomical object mounted adjacent a path formed by the indicia 108 and 14h (top and bottom) simulating the circulatory system. Tray 90 of FIG. 8 is another such example.

Figure 13:
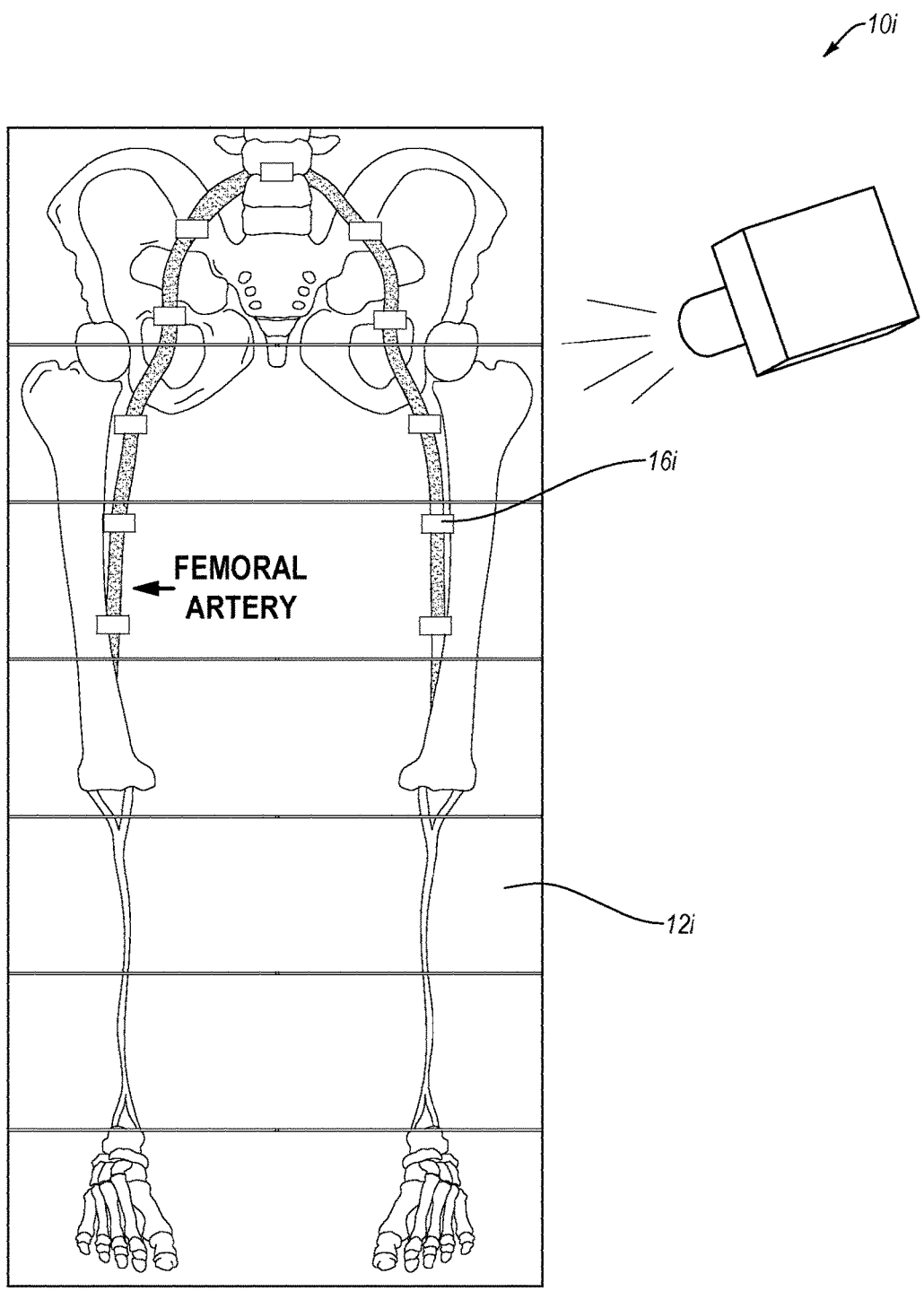
FIG. 13 is a view of yet another embodiment of a teaching aid having text thereon to identify anatomical features and featuring a radiopaque marker thereon to identify anatomical features in an X-ray environment.

FIG. 13 is a view of yet another embodiment of a teaching aid 10i having text thereon to identify anatomical features and further featuring visual indicia 14i having a radiopaque material, e.g., a marker on template 12i to further distinguish anatomical features (i.e., the femoral artery in FIG. 13) in an x-ray environment for purposes of training in a catheter lab or similar environment. Such radiopaque features of indicia 14i show such portions more clearly in an x-ray or catheter lab environment. First members 16i of a two part connection assembly (e.g., VELCRO® hook-and-loop fasteners, magnet) may be used to connect to various types of connectors and/or simulated anatomical objects.

As another example of a radiopaque marker, a wire or other metallic object is placed in a desired location on template 12i. The wire or other metallic object can be laminated onto a panel of template 12i in a lamination process, for example.

FIG. 14 shows one embodiment of a convenient portable teaching kit of the present invention, which can be portably transported between teaching demonstrations in various classroom settings, for example, comprising: (i) a container 130, such as a briefcase, computer bag, or other carrying structure or device, (ii) a folded teaching aid 10g (from FIGS. 9A-B, for example), (iii) a medical device 30, such as a stent catheter assembly, (iv) selectively mountable connectors 60, 62, 64, (v) selectively mountable simulated anatomical objects, 66, and (vi) trays 90, 124, all of which can be conveniently placed in container 130, then used when desired for use in a teaching setting. Thus, the embodiment of the kit of the present invention shown in FIG. 14 can be used quickly and efficiently by removing the contents of the container 30, then unrolling or unfolding teaching aid 10g and connecting one or more of the connectors 60, 62, 64, simulated anatomical objects, 66, thereon and mounting the trays 90, 124, adjacent thereto, and then coupling medical device 30 to teaching aid 10g and engaging in a teaching session to demonstrate the use of the medical device.

It will be appreciated that various methods for teaching or demonstrating a use of a medical device are described herein. The following is an example of a method for demonstrating a use of a medical device. The method includes positioning a teaching aid in preparation for demonstrating a use of a medical device. The teaching aid may be any of the teaching aids described herein. For example, the teaching or demonstration aid may include a template having visual indicia thereon simulating the circulatory or other system of an organism.

Following positioning the teaching aid, a medical device may be positioned relative to the aid. For example, a medical device may be inserted through at least one connector of the aid. In some embodiments, a simulated anatomical object may first be positioned relative to the aid such that the medical device may be inserted through the connector via the anatomical object. Examples of simulated anatomical objects are described herein. For example, tubing (such as tubing 56 shown in FIG. 5) may simulate an artery or vein, simulated circulatory objects (such as trays 80, 90 shown in FIGS. 7-8) may simulate various body lumens or other anatomical features, other objects or combinations thereof may be used. In some embodiments, the use of the medical device may be demonstrated following advancing the medical device.

Positioning the aid may include unrolling or unfolding (i.e., as shown in FIGS. 1A and 1B) the aid. For example, the aid may be unrolled from a rolled configuration (i.e., as shown in FIG. 16) or unfolded from a folded configuration, as described herein. In some embodiments, the aid may be moved from a non-planar configuration into a planar configuration. In other embodiments, the aid may be moved into a desired non-planar configuration. In further embodiments, the aid may be moved into a combination of planar and non-planar configurations. For instance, the aid can have various angular orientations to approximate a desired anatomy (as shown, for example, in FIGS. 1B-1C, 9A, 10, 11, 12, 15, and 17A-17B).

In addition to the above, the method can include positioning a support assembly relative to the base. The support assembly may include a structure to change the angular orientation of the base or a supplemental member disposed on the base. For example, as shown in FIGS. 10-12 and 15, support members, such as cushion 120 (shown in FIG. 10), the water bath 124 (shown in FIG. 11), tray 90 (shown in FIG. 12), support assemblies 136 (shown in FIG. 15), other support structures, or combinations thereof may be used to support the aid in a desired configuration.

In still another configuration, the method can include positioning a plurality of connectors relative to the visual indicia, as described herein. Various connectors and/or combinations of connectors may be positioned relative to the visual indicia provided with the aid.

In some embodiments, at least one simulated anatomical object may be positioned relative to the aid. This may be accomplished by positioning the object within at least one of the plurality of connectors (as shown, for example, in FIG. 5).

In another embodiment, positioning the plurality of connectors may include attaching a connector to a portion of the base so that the connector can position the medical device and/or the simulated anatomical object in alignment with the visual indicia, as shown, for example, in FIG. 3.

In still another embodiment of the method, the teaching or demonstration aid can be positioned to form one or more contours with the base, the one or more contours simulating a clinical environment for use of the medical device. These one or more contours include attaching a portion of the base to itself to form the one or more contours, such as bottom side of the base to itself, for example. Some examples of forming one or more contours include FIGS. 1B-1C, 9A, 10-12, 15, and 17B.

Figure 15:
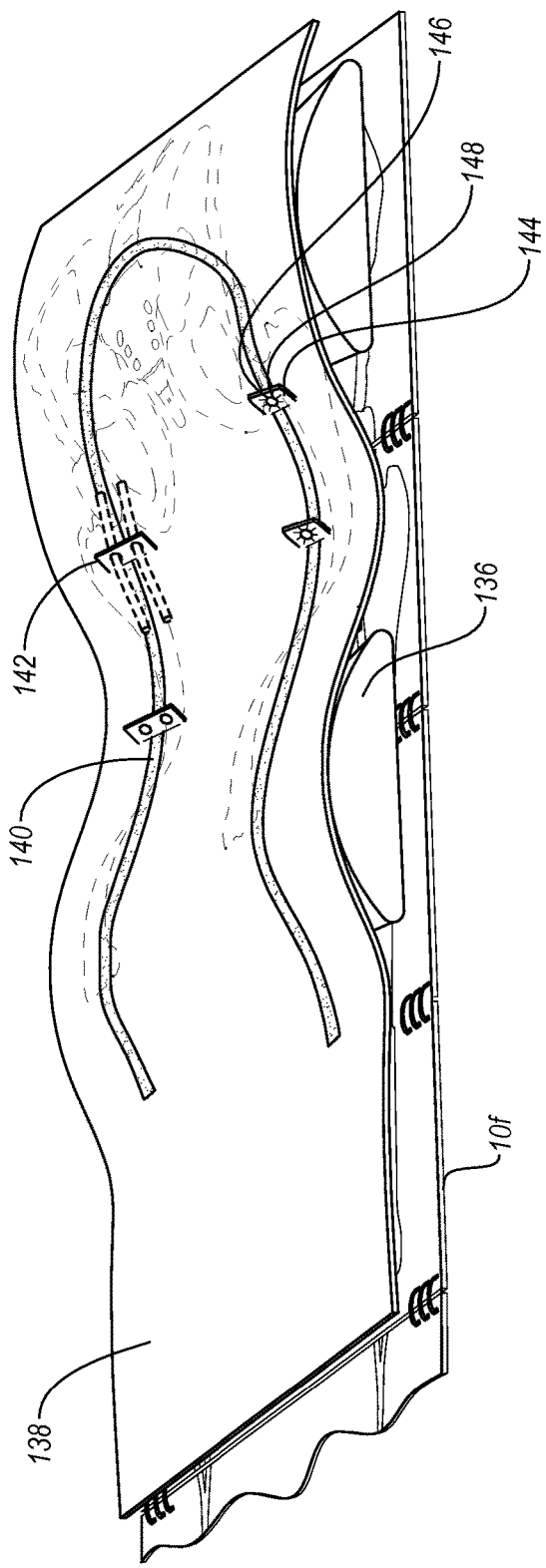
FIG. 15 shows the embodiment of the teaching aid of FIG. 7 having support assemblies mounted thereon and having a supplemental sheet placed over the support assemblies, the supplemental sheet having anatomical indicia and alternate connectors thereon.
Figure 16:
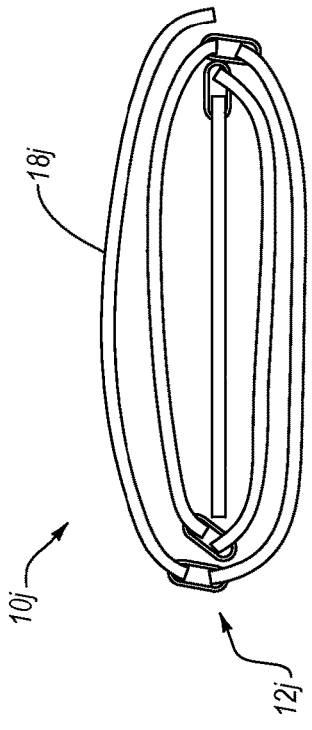
FIG. 16 shows another embodiment of a teaching aid of the present invention that is rolled as an efficient method of storing the teaching aid.

FIG. 15 shows an embodiment of a teaching aid 10f, having support assemblies 136 mounted on a base or template thereon and having a supplemental sheet 138 mounted on top of the support assemblies 136 and teaching aid 10f. Supplemental sheet 138 may be selectively, magnetically attached to teaching aid 10f, for example, such that the anatomy on supplemental sheet 138 corresponds to that of teaching aid 10f, for example. Supplemental sheet 138 has indicia 140 simulating the circulatory system of an organism thereon and further has connectors 142, 144 mounted on supplemental sheet 138, the connectors being mounted adjacent the path of the indicia 140. Alternatively, supplemental sheet 138 can be transparent or include transparent portions so that the circulatory system of an organism, for example, illustrated on the base or template below is visually perceivable through the supplemental sheet 138.

Connecters 142, 144 are additional embodiments of connectors that may be used on the supplemental sheets and/or the templates shown in this application and in the accompanying figures. First connector 142 on supplemental sheet 138 is a dual-track connector having a plurality of apertures therein such that a plurality of simulated anatomical objects may be used on the supplemental sheet 138 so as to be adjacent a path formed by indicia 140 simulating the circulatory system. In one embodiment, one such anatomical object is a simulated vascular object representing a relatively healthy artery, while the second object is a simulated vascular object representing a relatively unhealthy or complicated artery structure, for example. Such simulated anatomical objects, e.g., simulated vascular objects, may attach to a template and/or a supplemental sheet mounted on the template or on a support structure mounted thereon.

Second connector 144 shown in FIG. 15 on supplemental sheet 138 has an aperture 146 with contiguous adjacent slits 148 such that different sized catheters or other medical devices can be placed therethrough. First and second connectors 142, 144 are examples of connectors that may be mounted on the templates and/or supplemental sheets shown herein adjacent the path formed by indicia simulating the circulatory system.

With reference now to FIG. 16, yet another embodiment of a teaching aid 10j of the present invention (shown in an end view) is configured to conveniently roll into a storage position as shown in FIG. 16. As shown in FIG. 16, the panels 18j of the template 12j of teaching aid 10j are different sizes, i.e., different widths, such that the template 12*j* conveniently rolls and unrolls despite the hinged connections between panels. The top panel of teaching aid 10*j* shown in FIG. 16 has the widest configuration while the bottom panel has a decreased width and the remaining movably connected panel members have increasingly decreased widths such that the template conveniently rolls and unrolls into a configuration represented in FIG. 16.

Teaching aid 10*j* may be similar to the other teaching aids described herein, having indicia simulating the circulatory system, and connectors for connecting to a medical devices, and further having panels that are connected with panel connectors as shown in various of the teaching aids described herein. Teaching aid may be similar or identical to teaching aid 10, for example, except that panels 18*j* decrease in size with respect to each other. Thus, teaching aids of the present invention may fold in a variety of different configurations such as an accordion-style and/or a z-shaped style or may roll up, as shown in FIG. 16, or various combinations thereof.

Teaching aid 10*j* is an example of a teaching aid with visual indicia thereon simulating the circulatory system of an organism, the teaching aid comprising: (i) a template 12*j* having visual indicia thereon simulating the circulatory system of an organism, the template comprising a base and visual indicia on the base simulating the circulatory system of an organism; and (ii) a plurality of connectors for connecting a medical device to the template, the connectors being mounted on a top surface of the template adjacent a path of the indicia simulating the circulatory system, such that the medical device can be placed on the connectors so as to simulate following the path of the circulatory system. Teaching aid 10*j* is comprised of hinged panels 18*j* having different sizes, such that the teaching aid 10*j* conveniently rolls into a storage position and unrolls into a use orientation for demonstrating the use of a medical device, such as the stent deployment catheter described herein.

Figure 17A:
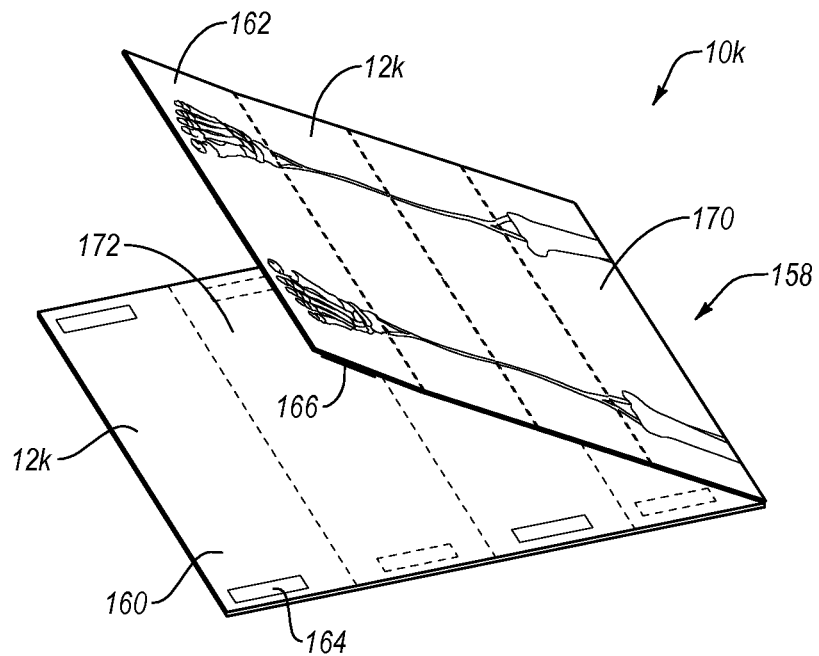
FIGS. 17A-17B show yet another embodiment of the teaching aid of the present invention, the teaching aid having attachment members on the bottom surfaces thereof, such that the teaching aid can be folded onto itself to form contours that simulate environmental or patient conditions.
Figure 17B:
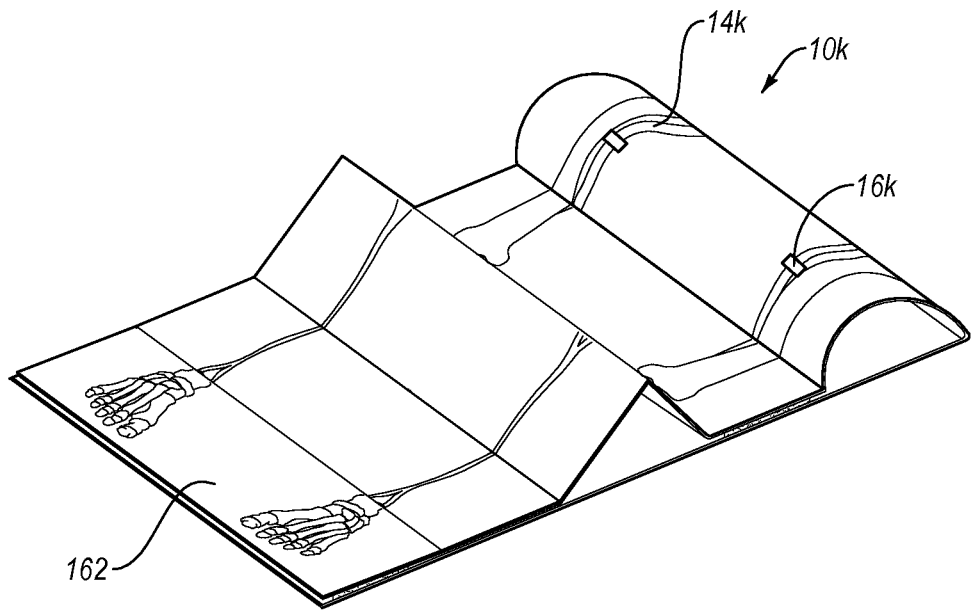

FIGS. 17A and 17B illustrate another embodiment of a teaching aid 10*k*, which can be folded with respect to itself in order to form unique three dimensional configurations that simulate an environmental and/or patient setting, as shown. Teaching aid 10*k* comprises a template 12*k* having a first end 160 and a second end 162, a top side 170 and a bottom side 172, wherein first end 160 folds with respect to second end 162 so as to selectively connect to second end 162 on the bottom side 172 thereof in order to simulate a clinical environment with contours, bumps, and non-planar orientations, as shown in FIG. 17B.

Template 158 has indicia 14*k* thereon simulating the circulatory system of an organism and further, has connectors 16*k* on a top side 170 thereof adjacent the path of the circulatory system. Template 158 further has first and second attachment members 164, 166 on bottom side 172 of template 158, such that the first and second attachment members join when desired to fold template 158 as illustrated in FIGS. 17A and 17B. Attachment members 164 (e.g., hook material) and 166 (e.g., loop material) are examples of two-part attachment members (e.g., VELCRO® hook-and-loop fasteners) such that when the first end 160 of template 12*k* is moved underneath second side 162 of template 12*k*, first attachment members 164 are connected to second attachment members 166, thereby forming an assembly that integrally demonstrates simulated environmental structure and/or a patient setting without the use of separate support assembly.

Thus by connecting a portion of the template 12*k* to itself, such environmental conditions can be simulated. A variety of different two-part attachment members such as magnets, clips, studs, male/female connection assemblies or other connectors can be used in order to achieve such self-attachment of template 12*k*. Those two-part attachment members can also be used for other configurations of the teaching aids described herein where structures are to be connected, coupled or attached.

In one embodiment, the first and second attachment members 164, 166 are located in certain designed locations such that a desired shape, such as the three dimensional shape shown in FIG. 17B will appear upon folding. Also as shown in FIG. 17B, in one embodiment, the folding of the template 12*k*, may produce a three dimensional structure similar to a pop-up book such that environmental conditions may be simulated.

In yet another embodiment, the teaching aids of the present invention can be used in conjunction with a video camera, a display connected thereto, and software that enhances the teaching and training experience. For example, a video camera can be used during the use of a teaching aid of the present invention and software can be employed to add additional simulated elements on a screen which the practitioner views while using a medical device on one of the teaching aids of the present invention. In one such embodiment, an iOS-based augmented reality software system can be used to project additional layers of information on the iOS device's screen when the iOS device's camera is fixed on the front surface of the model. The software can adjust the images in order to make the anatomy appear to be more or less complicated, thereby enhancing the training experience of the practitioner. The video camera may be mounted on a tripod focusing on the teaching aid and the movement of a medical device with respect to the teaching aid while the practitioner views a screen that shows additional images that are not on the teaching aid. The additional images added by the augmented reality software add additional teaching experiences to the use of the teaching aid. This type of video experience may simulate the practitioner's use of a catheter assembly in an X-ray environment and the software adjusts the images such that additional experiences can be simulated in such an environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A portable teaching kit, the teaching kit configured to receive a medical device within a portion of the teaching kit such that the teaching kit is configured to be used to demonstrate use of the medical device, the teaching kit comprising:
 (i) a template comprising:
   a. a base having a top side and a bottom side, wherein the base comprises a plurality of planar panels connected together, wherein the planar panels are selectively moved with respect to each other; and
   b. an illustrated path on the top side of the base;
 (ii) a plurality of connectors integrally formed with the base adjacent the path, wherein each of a plurality of the plurality of connectors includes a planar member movable out of the base, the connector including a connection portion integrally formed with the base and a movable portion extending from the connection portion and being movable relative to the base and toward the connection portion to form a space between the connector and the base;

(iii) a simulated anatomical object that is selectively mounted on the template adjacent the path, the simulated anatomical object being mounted to extend through the space and transverse to a direction of movement of the movable portion relative to the connection portion, the simulated anatomical object having an opening through which a practitioner can selectively insert the medical device, wherein each connector of the plurality of the plurality of connectors is configured to selectively connect the simulated anatomical object to the template along the path; and (iv) a separate, open water bath configured to hold a liquid and simultaneously receive at least one of the planar panels of the template, the simulated anatomical object, and the medical device and simultaneously expose each to the liquid to simulate an aqueous environment for use of the medical device.

2. The portable teaching kit as recited in claim 1, wherein the planar panels are selectively folded with respect to each other into a compact storage position.

3. The portable teaching kit as recited in claim 1, wherein the template can be folded onto itself in order to simulate a clinical environment.

4. The portable teaching kit as recited in claim 1, wherein one or more of the connectors is located on the path.

5. The portable teaching kit as recited in claim 1, wherein the base comprises a waterproof material that connects the individual planar panels of the base to each other.

6. The portable teaching kit as recited in claim 1, wherein connectors of the plurality of connectors retain the simulated anatomical object above the top side of the base.

7. The portable teaching kit as recited in claim 1, wherein the template can be rolled into a storage position.

8. The portable teaching kit as recited in claim 1, further comprising a radio-opaque material on the template.

9. The portable teaching kit as recited in claim 1, further comprising a support assembly configured to be mounted adjacent the template to provide support to at least a portion of the base to thereby simulate environmental conditions of a medical procedure.

10. The portable teaching kit as recited in claim 1, further comprising a supplemental sheet having a path that corresponds to the path of the template.

11. The portable teaching kit as recited in claim 1, wherein the teaching kit further comprises a supplemental sheet having a path that corresponds to the path of the template, the supplemental sheet being coupled to the template and further comprising a simulated anatomical object that is selectively mounted between the template and the supplemental sheet.

12. The portable teaching kit as recited in claim 1, wherein the teaching kit further comprises a supplemental sheet having a path that simulates the circulatory system of the organism, the supplemental sheet being coupled to the template and further comprising a support assembly that is selectively mounted between the template and the supplemental sheet.

13. The portable teaching kit as recited in claim 1, wherein the path is different in appearance from the base.

14. The portable teaching kit as recited in claim 1, wherein the template is a sheet.

15. A portable kit for teaching techniques relating to treating circulatory system ailments, the kit comprising:

(i) a medical device;

(ii) a simulated anatomical object having an opening, the opening being configured to receive the medical device;

(iii) a teaching aid with a path thereon, the teaching aid configured to selectively receive the simulated anatomical object thereon, such that the teaching aid can be used to demonstrate use of a medical procedure in a practical setting, the teaching aid comprising:

a. a template having the path thereon, the template comprising:

a base having a top side and a bottom side, wherein the base comprises a plurality of panels connected together, wherein the panels are selectively folded with respect to each other into a compact storage position; and the path being disposed on the top side of the base; and b. a plurality of connectors mounted on the base adjacent the path for connecting the simulated anatomical object to the template along the path, the simulated anatomical object configured to receive the medical device therein such that the medical device can be placed within the simulated anatomical object, such that the teaching aid can be used to demonstrate use of the medical device in a practical setting;

(iv) each of:

a. a plurality of interchangeable support assemblies configured to be selectively positioned against the template, at least one of the interchangeable support assemblies being configured to selectively mount to the bottom side of the plurality of panels and angularly orientate the plurality of panels to simulate environmental conditions of an internal vasculature associated with the medical procedure and at least another one of the interchangeable support assemblies being configured to selectively mount to and extend from the top side of the plurality of panels simultaneously with the at least one of the interchangeable support assemblies, and at least another one of the interchangeable support assemblies including a plurality of tubular structures simulating a tortuous path for the medical device; and b. a separate, open water bath configured to hold a liquid and simultaneously receive a first panel of the template in an angular orientation relative to a second panel of the template that is orientated parallel to a base of the open water bath, the simulated anatomical object, and the medical device and simultaneously expose each to the liquid to simulate an aqueous environment for use of the medical device; and (v) a container for receiving and storing the teaching aid and the medical device, wherein the teaching aid can be used to demonstrate use of the medical device by selectively placing the medical device.

16. The portable kit as recited in claim 15, wherein the template can be selectively folded onto itself into a three-dimensional shape to simulate a clinical environment.

17. The portable kit as recited in claim 15, further comprising a supplemental sheet selectively associated with the teaching aid, wherein the supplemental sheet has an opening therein for extension of a catheter therethrough and into the simulated anatomical object.

18. The portable kit as recited in claim 15, wherein at least one of the plurality of connectors is a dual track connector.

19. The portable kit as recited in claim 15, further comprising one or more attachment members on a bottom surface of the template such that the template can be folded onto itself and maintained in a desired folded position in order to simulate a clinical environment.

20. The portable kit as recited in claim 15, wherein the template is comprised of hinged panels having different sizes, such that the template conveniently rolls into a storage position.

21. The portable kit as recited in claim 15, wherein the template is a sheet and wherein the path has a different appearance from the base, and further comprising a supplemental sheet having visual indicia that correspond to the path of the template, and wherein the simulated anatomical object is selectively mounted between the template and the supplemental sheet.

22. The portable kit as recited in claim 15, further comprising a video camera and a display that are used during use of the teaching aid.

23. A portable teaching kit with a path thereon, the teaching kit configured to receive a medical device within a portion of the teaching kit such that the teaching kit is configured to be used to demonstrate use of the medical device, the teaching kit comprising:
(i) a template having the path, the template comprising:
   a. a base having a top side and a bottom side, wherein the base comprises a plurality of panels connected together, wherein the panels are selectively moved with respect to each other; and
   b. the path on the top side of the base;
(ii) a plurality of connectors integrally formed with the base adjacent the path, wherein each of a plurality of the plurality of connectors is comprised of a planar member configured to move out of the base, the connector including a connection portion integrally formed with the base and a movable portion extending from the connection portion and being movable relative to the base and toward the connection portion to form a space between the connector and the base, the space being configured to receive a medical device transverse to a direction of movement of the movable free end relative to the connection end; and
(iii) a simulated anatomical object that is selectively mounted on the template adjacent the path, the simulated anatomical object being mounted to extend through the space and transverse to a direction of movement of the moveable portion relative to the connection portion, the simulated anatomical object having an opening through which a practitioner can selectively insert the medical device, wherein the plurality of connectors are configured to selectively connect the simulated anatomical object to the template along the path; and
(iv) a separate, open water bath having a tray-like form with a top open to atmosphere, the water bath being configured to hold a liquid and simultaneously receive 1) a first panel of the plurality of panels orientated parallel to a bottom of the water bath, (2) a second panel of the plurality of panels angularly orientated relative to the first panel, (3) the simulated anatomical object, and (4) the medical device, and simultaneously expose each to the liquid to simulate a heated aqueous environment within which the medical device is used;
   wherein the movable portion is peelable relative to the base and is selectively mechanically reattached to the base to create the space and position the selectively mounted simulated anatomical objected directly adjacent the base and the movable portion, with the movable portion curving from the connection portion to a terminal end of the movable portion.

24. The portable teaching kit as recited in claim 23, wherein the panels are selectively folded with respect to each other into a compact storage position.

25. The portable teaching kit as recited in claim 23, wherein the template can be folded onto itself in order to simulate a clinical environment.

26. The portable teaching kit as recited in claim 23, further comprising a plurality of C-shaped connectors selectively mounted to the template.

27. The portable teaching kit as recited in claim 23, wherein the simulated anatomical object comprises a tubular member with a simulated lesion.

28. The portable teaching kit as recited in claim 23, wherein the simulated anatomical object comprises a tubular member with a simulated occlusion defect.

29. The portable teaching kit as recited in claim 23, further comprising a plurality of support assemblies configured to be mounted adjacent the template to provide support to at least a portion of a supplemental sheet having the path thereupon, the plurality of support assemblies forming the supplemental sheet with a curved configuration to simulate a clinical environment.

30. The portable teaching kit as recited in claim 23, wherein the simulated anatomical object comprises a tray selectively mounted to the template, the tray comprising a plurality of tubular structures formed in a tortuous path.

31. The portable teaching kit as recited in claim 30, further comprising a selectively removable supplemental sheet having a path that correspond to the path of the template, the removable supplemental sheet being stacked upon the tray.

* * * * *